US009775089B2

United States Patent
Payyappilly et al.

(10) Patent No.: US 9,775,089 B2
(45) Date of Patent: Sep. 26, 2017

(54) RECEIVED SIGNAL STRENGTH INDICATOR (RSSI) REALIZING CELLULAR RADIO ACCESS TECHNOLOGY TYPE MEASUREMENTS IN A WIRELESS LOCAL AREA NETWORK DOMAIN

(71) Applicant: QUALCOMM Incorporated, San Diego, CA (US)

(72) Inventors: Ajith Tom Payyappilly, San Diego, CA (US); Youjun Fan, San Diego, CA (US); Juan Zhang, San Diego, CA (US); Daniel Amerga, San Diego, CA (US); Arnaud Meylan, San Diego, CA (US); Aziz Gholmieh, Del Mar, CA (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 14/931,492

(22) Filed: Nov. 3, 2015

(65) Prior Publication Data

US 2017/0127330 A1    May 4, 2017

(51) Int. Cl.
*H04W 36/30* (2009.01)
*H04W 24/10* (2009.01)
(Continued)

(52) U.S. Cl.
CPC .......... *H04W 36/30* (2013.01); *H04B 17/382* (2015.01); *H04W 24/10* (2013.01);
(Continued)

(58) Field of Classification Search
CPC .. H04W 24/10; H04W 36/14; H04W 36/0061
See application file for complete search history.

(56) References Cited

U.S. PATENT DOCUMENTS

| 2011/0207490 A1* | 8/2011 | Lee | H04W 88/06 455/509 |
| 2011/0235614 A1* | 9/2011 | Lerzer | H04W 76/021 370/331 |

(Continued)

OTHER PUBLICATIONS

Catt., "RRM Measurements for LWA and LWI", Mobile Competence Centre, 3GPP Draft, R2-154071, 650, Route Des Lucioles, F-06921, Sophia-Antipolis CEDEX, France, vol. RAN WG2, No. Malmo, Sweden; 20151005-20151009, Oct. 4, 2015, XP051004683, 7 Pages. Retrieved from the Internet: URL:http://www.3gpp.org/ftp/Meetings_3GPPSYNC/RAN2/Docs/.

(Continued)

*Primary Examiner* — Brian D Nguyen
(74) *Attorney, Agent, or Firm* — Patterson & Sheridan, L.L.P.

(57) ABSTRACT

Certain aspects of the present disclosure relate to methods and apparatus for measurement reporting. The method comprises receiving, via a first radio access technology (RAT), a first request for one or more measurement reports, translating the first request to a group of second requests for measurement associated with at least a second RAT, and transmitting at least one of the second requests to initiate gathering measurements associated with the second RAT for use in generating the one or more measurement reports in response to the first request.

30 Claims, 34 Drawing Sheets

(51) Int. Cl.
    *H04W 36/00*     (2009.01)
    *H04W 36/14*     (2009.01)
    *H04B 17/382*     (2015.01)
    *H04B 17/318*     (2015.01)
    *H04B 17/336*     (2015.01)

(52) U.S. Cl.
    CPC ....... *H04W 36/0061* (2013.01); *H04W 36/14* (2013.01); *H04B 17/318* (2015.01); *H04B 17/336* (2015.01); *H04W 36/0088* (2013.01)

(56) References Cited

U.S. PATENT DOCUMENTS

| | | | | |
|---|---|---|---|---|
| 2013/0329694 | A1* | 12/2013 | Vrzic | H04W 36/165 370/331 |
| 2015/0237645 | A1* | 8/2015 | Andrianov | H04W 72/1215 370/329 |
| 2016/0095009 | A1* | 3/2016 | Ling | H04W 16/14 370/329 |
| 2016/0135100 | A1* | 5/2016 | Teyeb | H04W 36/0055 370/331 |

OTHER PUBLICATIONS

Ericsson., "Layer-3 Filtering for WLAN Measurements", Mobile Competence Centre, 3GPP Draft, R2-154630, 650, Route Des Lucioles ; F-06921, Sophia-Antipolis CEDEX, France, vol. RAN WG2, No. Malmo, Sweden; 20151005-20151009, Oct. 4, 2015, XP051005149, 2 pages. Retrieved from the Internet: URL:http://www.3gpp.org/ftp/Meetings_3GPPSYNC/RAN2/Docs/.

Ericsson., "WLAN Measurement Reporting", Mobile Competence Centre ; 3GPP Draft, R2-154629, 650, Route Des Lucioles, F-06921, Sophia-Antipolis CEDEX ; France, vol. RAN WG2, No. Malmo, Sweden; 20151005-20151009, Oct. 4, 2015, XP051005148, 7 pages. Retrieved from the Internet: URL:http://www.3gpp.org/ftp/Meetings_3GPPSYNC/RAN2/Docs/.

International Search Report and Written Opinion—PCT/US2016/058638—ISA/EPO—Dec. 14, 2016.

LG Electronics Inc., "WLAN Measurement Framework", Mobile Competence Centre, 3GPP Draft, R2-154471, 650, Route Des Lucioles, F-06921, Sophia-Antipolis CEDEX, France, vol. RAN WG2, No. Malmo, Sweden; 20151005-20151009,, Oct. 4, 2015, XP051005035, 4 pages. Retrieved from the Internet: URL:http://www.3gpp.org/ftp/Meetings_3GPPSYNC/RAN2/Docs/.

Spreadtrum Communications., "Discussion on RRM Issues for LTE WLAN Interworking Enhancement", Mobile Competence Centre, 3GPP DRAFT; R2-153253, 650, Route Des Lucioles, F-06921, Sophia-Antipolis CEDEX, vol. RAN WG2, Aug. 23, 2015, XP051004008, 4 pages. Retrieved from the Internet: URL:http://www.3gpp.org/ftp/Meetings_3GPPSYNC/RAN2/Docs/.

\* cited by examiner

RECEIVED SIGNAL STRENGTH INDICATOR (RSSI) REALIZING CELLULAR RADIO ACCESS TECHNOLOGY TYPE MEASUREMENTS IN A WIRELESS LOCAL AREA NETWORK DOMAIN

BACKGROUND

Field of the Disclosure

The present disclosure relates generally to wireless communication, and more particularly, to methods and apparatus for realizing cellular radio access technology (RAT) type measurements in a wireless local area network domain.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

As wireless communication technology advances, a growing number of different radio access technologies are being utilized. For instance, many geographic areas are now served by multiple wireless communication systems, each of which can utilize one or more different air interface technologies. In order to increase versatility of wireless terminals in such a network environment, there recently has been an increasing trend toward multi-mode wireless terminals that are able to operate under multiple radio technologies. For example, a multi-mode implementation can enable a terminal to select a system from among multiple systems in a geographic area, each of which may utilize different radio interface technologies, and subsequently communicate with one or more chosen systems.

In some cases, such a system may allow traffic to be offloaded from one network, such as a wireless wide area network (WWAN) to a second network, such as a wireless local area network (WLAN) or to use aggregation to increase bandwidth using both.

BRIEF SUMMARY

Certain aspects of the present disclosure provide a method for measurement reporting. The method generally includes receiving, via a first radio access technology (RAT), a first request for one or more measurement reports, translating the first request to a group of second requests for measurement associated with at least a second RAT, and transmitting at least one of the second requests to initiate gathering measurements associated with the second RAT for use in generating the one or more measurement reports in response to the first request.

Certain aspects of the present disclosure provide an apparatus for measurement reporting. The apparatus generally includes means for receiving, via a first radio access technology (RAT), a first request for one or more measurement reports, means for translating the first request to a group of second requests for measurement associated with at least a second RAT, and means for transmitting at least one of the second requests to initiate gathering measurements associated with the second RAT for use in generating the one or more measurement reports in response to the first request.

Aspects also provide various apparatus, systems, computer program products, and processing systems for performing the operations described above.

DETAILED DESCRIPTION

Figure 1:
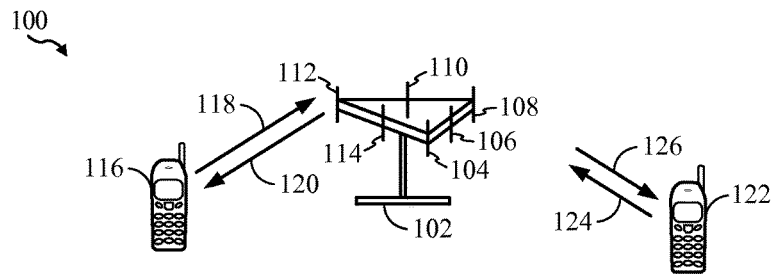
FIG. 1 illustrates a multiple access wireless communication system in which aspects of the present disclosure may be utilized.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure provide techniques that may be used to convert cellular measurement objects into instructions that a WiFi chipset may understand in order to make measurements regarding available WiFi networks. According to certain aspects, cellular measurement messages may be translated into messages that conform to WiFi concepts and are compatible with WiFi chipsets. According to certain aspects, a cellular measurement object may be translated into a group of interface messages, including an entering and leaving conditions. The entering condition may be based on, for example, at least one received signal strength indicator (RSSI) as compared to one or more threshold values. Once the entering condition is met, the UE may send RSSI based WiFi measurement reports at regular intervals. After an initial WiFi measurement report is received, the leaving condition (e.g., exit criteria) may be set. One or more exit criteria (e.g., leaving condition) may also be based on, for example, a RSSI as compared to another threshold value. Once the exit criteria is met, the RSSI based WiFi measurement reporting may be halted.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA technique has similar performance and essentially the same overall complexity as those of an OFDMA system. However, an SC-FDMA signal has a lower peak-to-average power ratio (PAPR) because of its inherent single carrier structure. The SC-FDMA technique has drawn great attention, especially in the uplink communications where lower PAPR greatly benefits the mobile terminal in terms of transmit power efficiency. Use of SC-FDMA is currently a working assumption for uplink multiple access scheme in the 3GPP LTE and the Evolved UTRA.

An access point ("AP") may comprise, be implemented as, or known as a NodeB, a Radio Network Controller ("RNC"), an eNodeB, a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Example Wireless Communications System

FIG. 1 illustrates a multiple access wireless communication system 100 in which aspects of the present disclosure may be utilized. For example, the wireless communication system 100 may be an LTE or WiFi system. UE 116 or 122 (sometimes referred to as access terminals or ATs) may receive configuration information (e.g., configuration information for wireless wide area network (WWAN)-wireless local area network (WLAN) aggregation and/or configuration information for WLAN offloading) for one or more data bearers from the access point (AP) 102 (which may also be referred to as a base station or eNodeB).

The UE 116 or 122 may determine whether to communicate with the AP 102 (and or other APs or base stations) using WWAN-WLAN aggregation or using WLAN offloading, for example, based on how the configuration information was signaled or based on the type of the configuration information.

As illustrated, AP 102 may include multiple antenna groups, one group including antennas 104 and 106, another group including antennas 108 and 110, and an additional group including antennas 112 and 114. In FIG. 1, two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124, and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 102.

In communication over forward links 120 and 126, the transmitting antennas of access point 102 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
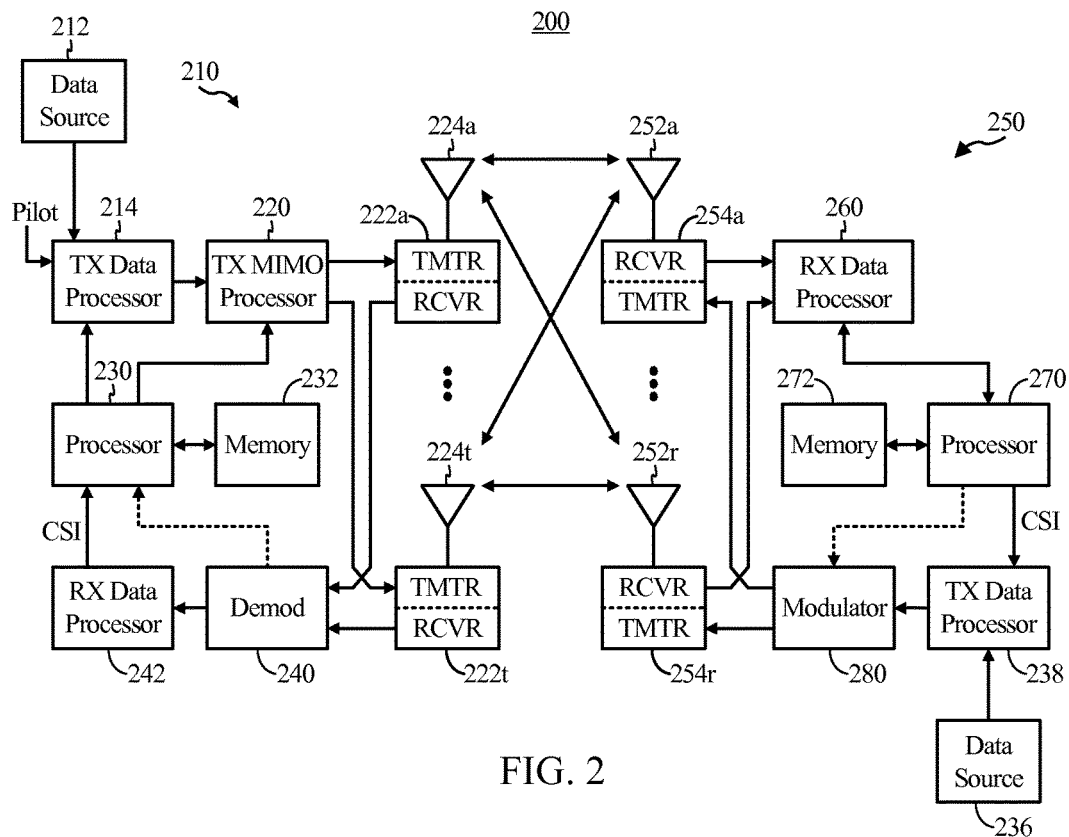
FIG. 2 illustrates example components of the base station/eNB and UE, which may be used to implement aspects of the present disclosure.

FIG. 2 illustrates a block diagram of a transmitter system 210 (also known as an access point) and a receiver system 250 (also known as an access terminal) in a multiple-input multiple-output (MIMO) system 200. Transmitter system 210 and receiver system 250 may be examples of the AP 102 and UEs/ATs 116 and 122 described above with reference to FIG. 1.

At the transmitter system 210, traffic data for a number of data streams is provided from a data source 212 to a transmit (TX) data processor 214. In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software for the transmitter system 210.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals may be received by NR antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

Figure 9:
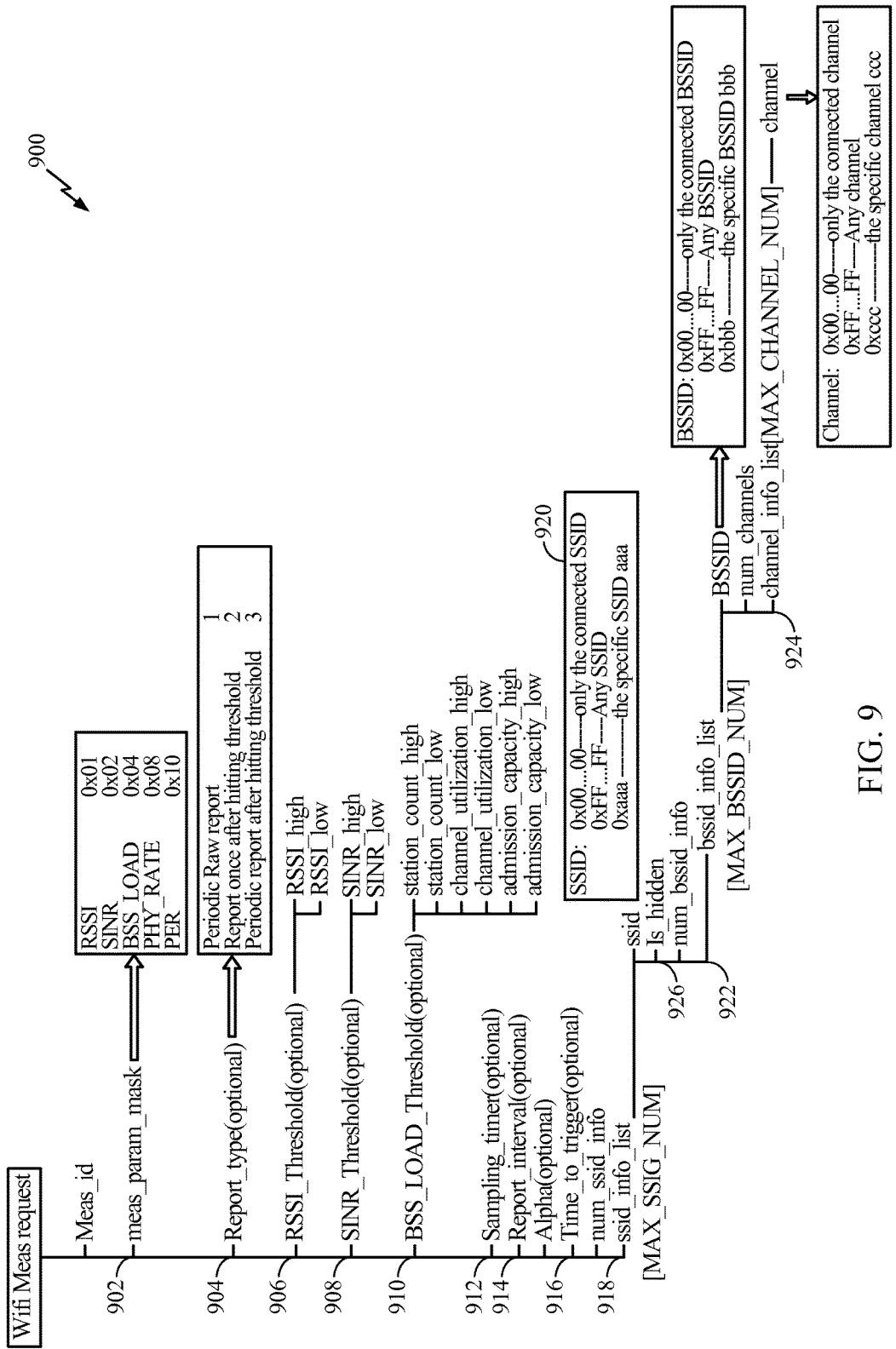
FIG. 9 illustrates an example WiFi measurement request message format, in accordance with certain aspects of the present disclosure.

One or more of processor 270, RX data processor 260, and TX data processor 238 may direct receiver system 250 in performing operations 900, illustrated in FIG. 9, according to certain aspects of the present disclosure. Memory 272 may store instructions or code to be executed by the processor, the RX data processor, and the TX data processor when directing the receiver system in performing operations 900.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
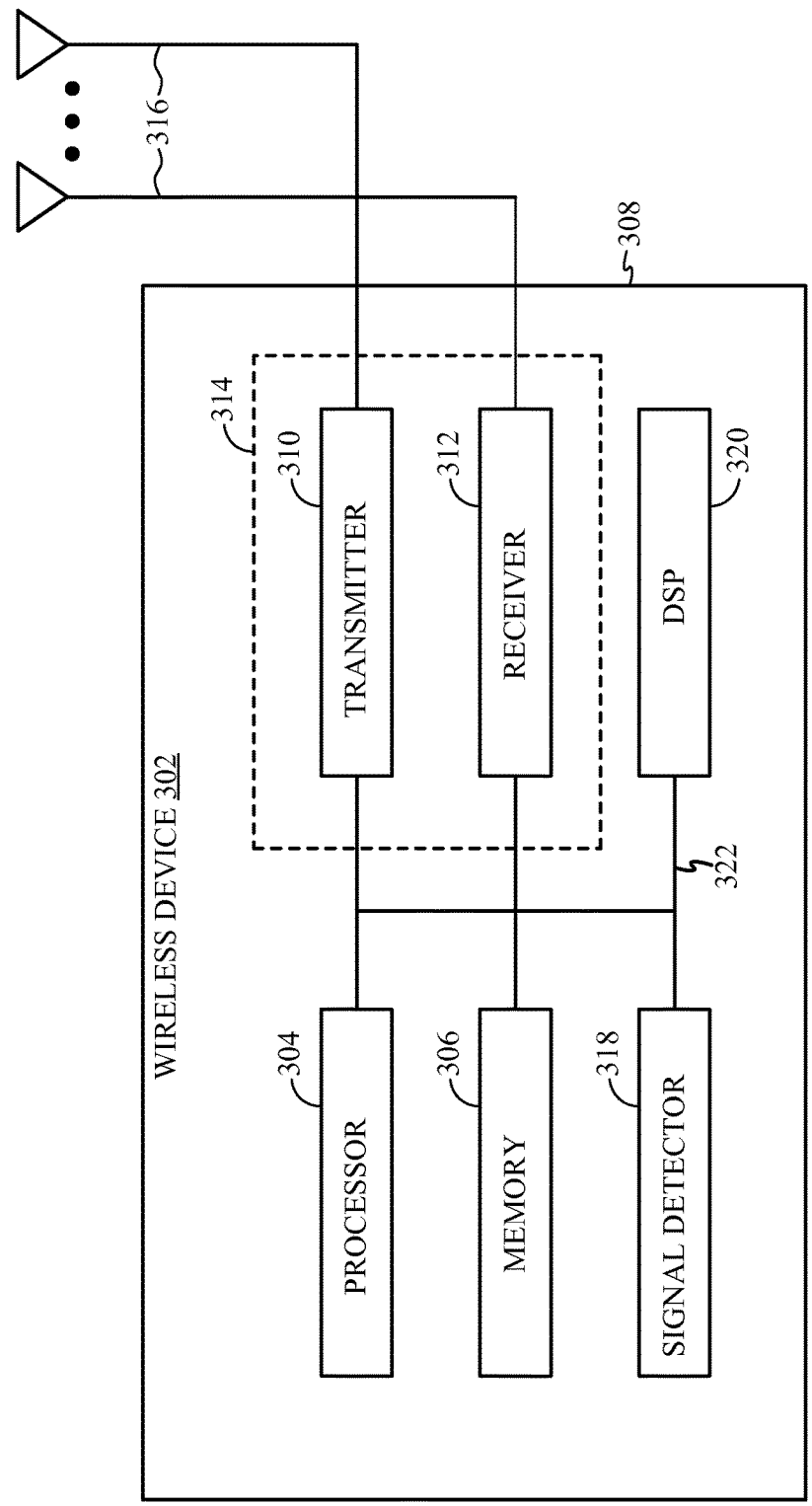
FIG. 3 illustrates various components that may be utilized in a wireless device that may be employed within the wireless communication system illustrated in FIG. 1.

FIG. 3 illustrates various components that may be utilized in a wireless device 302 that may be employed within the wireless communication system illustrated in FIG. 1. The wireless device 302 is an example of a device that may be configured to implement the various methods described herein. For example, the wireless device 302 may be used to perform the operations and/or call flows described herein.

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
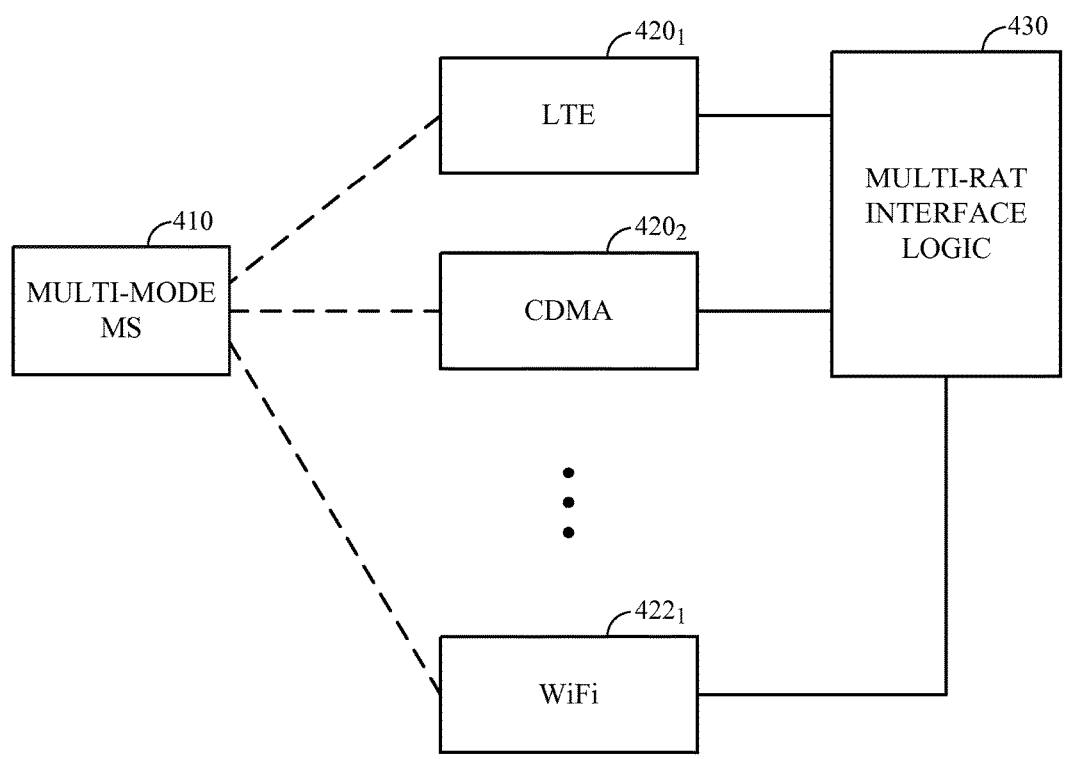
FIG. 4 illustrates an example a multi-mode mobile station, in accordance with aspects of the present disclosure.

In order to expand the services available to subscribers, some mobile stations (MS) support communications with multiple radio access technologies (RATs). For example, as illustrated in FIG. 4, a multi-mode MS 410 may support LTE for broadband data services and code division multiple access (CDMA) for voice services. Illustratively, LTE is shown as a first RAT $420_1$, CDMA is shown as a second RAT $420_2$, and Wi-Fi is shown as a third RAT $422_1$.

In certain applications, multi-RAT interface logic 430 may be used to exchange information between both wide-area (e.g., long-range) and local-area (e.g., short-range) RATs. This may enable a network provider to control how, e.g., through which RAT, an end user of the multi-mode MS 410 actually connects to the network. The interface logic 430 may support local IP connectivity or IP connectivity to a core network, for example.

For example, a network provider may be able to direct the multi-mode MS to connect to the network via local-area RAT, when available. This capability may allow a network provider to route traffic in a manner that eases congestion of particular air resources. In effect, the network provider may use local-area RATs to distribute some air traffic of a wide-area RAT into a wireline network or to distribute some air traffic from a congested wireless network to a less congested wireless network. The traffic may be re-routed from the local-area RAT when conditions mandate, such as when a mobile user increases speed to a certain level not suitable for a local-area RAT.

Further, since wide-area RATs are typically designed to provide service over several kilometers, the power consumption of transmissions from a multi-mode MS when using a wide-area RAT is non-trivial. In contrast, local-area RATs (e.g., Wi-Fi) are designed to provide service over several hundred meters. Accordingly, utilizing a local-area RAT when available may result in less power consumption by the multi-mode MS 410 and, consequently, longer battery life.

Example WWAN-WLAN Aggregation

According to certain aspects, wireless wide area network (WWAN) wireless local area network (WLAN) aggregation at the radio access network (RAN) may be supported by the network and/or the user equipment (UE). The air links can be aggregated at the medium access control (MAC) layer. WWAN-WLAN aggregation at the RAN may also be referred to herein as "RAN aggregation".

RAN aggregation is an approach for offloading traffic between 3GPP access networks (WWAN), such as long term evolution (LTE) or high speed packet access (HSPA) and non-3GPP access networks (WLAN) such as WiFi. This permits use of a WLAN access service by 3GPP subscribers. RAN aggregation may be done at the radio link control (RLC) and packet data convergence protocol (PDCP) layers.

Two levels of RAN aggregation are considered in the present disclosure: bearer selection and RLC/PDCP aggregation. There is PDCP and RLC aggregation per radio bearer. Access to packet data network (PDN) services and associated applications is provided to a UE by evolved packet system (EPS) bearers. A Default Bearer is typically established during attachment and maintained throughout the lifetime of the PDN connection. As a result of service requests for access to services, additional Dedicated Bearers can be dynamically established. If the UE supports RLC-aggregation the UE can be capable of communicating RLC-aggregated data of a same bearer on the multiple RATs (e.g., LTE and WiFi) simultaneously.

For bearer selection, the base station (BS) or RAN may determine for each bearer (bearer-level) where (e.g., which RAN) to serve an IP packet, for example, based on the Traffic Flow Template (TFT) associated with the bearers. No common PDCP or RLC may be used between different serving nodes (e.g., LTE or WiFi), since no reordering issue may exist between bearers. Bearer selection may be a pure RAN option, but may also have core network (CN) involvement (e.g., S1 bearer moved to WLAN AP to serve directly from the serving gateway (SGW)). Corresponding uplink (UL) and downlink (DL) EPS bearers should be served by the same eNB, since RLC feedback is sent on the corresponding DL or UL bearer—unless the RLC control plane is decoupled from the RLC data plane.

For RLC/PDCP aggregation, a common RLC/PDCP may be used across serving nodes to reorder the packets in a flow. The BS may determine where to serve each RLC/PDCP packet (packet-level) based on scheduling on each carrier. RLC/PDCP aggregation may be a purely RAN option.

RAN aggregation can involve EPS bearers that terminate at the RAN (i.e., the UE transmits or receives packets on the bearers to or from the WLAN AP). In this case, for bearer selection, the UE may use separate EPS bearers at the eNB and WLAN AP (e.g., the existing EPS bearers may be uniquely mapped to be served by either the eNB or the WLAN AP serving the UE). For RLC/PDCP aggregation, the UE may use common EPS bearers at the eNB and WLAN AP (e.g., existing EPS bearers may be mapped to be served by both the eNB and the WLAN AP serving the UE). DL data received at the packet gateway (PGW) may be separated into different EPS bearers and forwarded either to the eNB or WLAN AP. For S2a connectivity, UL data received at the eNB and WLAN AP may be forwarded to the SGW and PGW in the appropriate EPS bearer and S2a/S2b or S2c tunnel, respectively. For S1 bearer based session continuity, the UL data received at the eNB and WLAN AP is forwarded to the SGW and PGW in the appropriate EPS bearer (e.g., the AP reuses the EPS bearer to forward the traffic).

Figure 5:
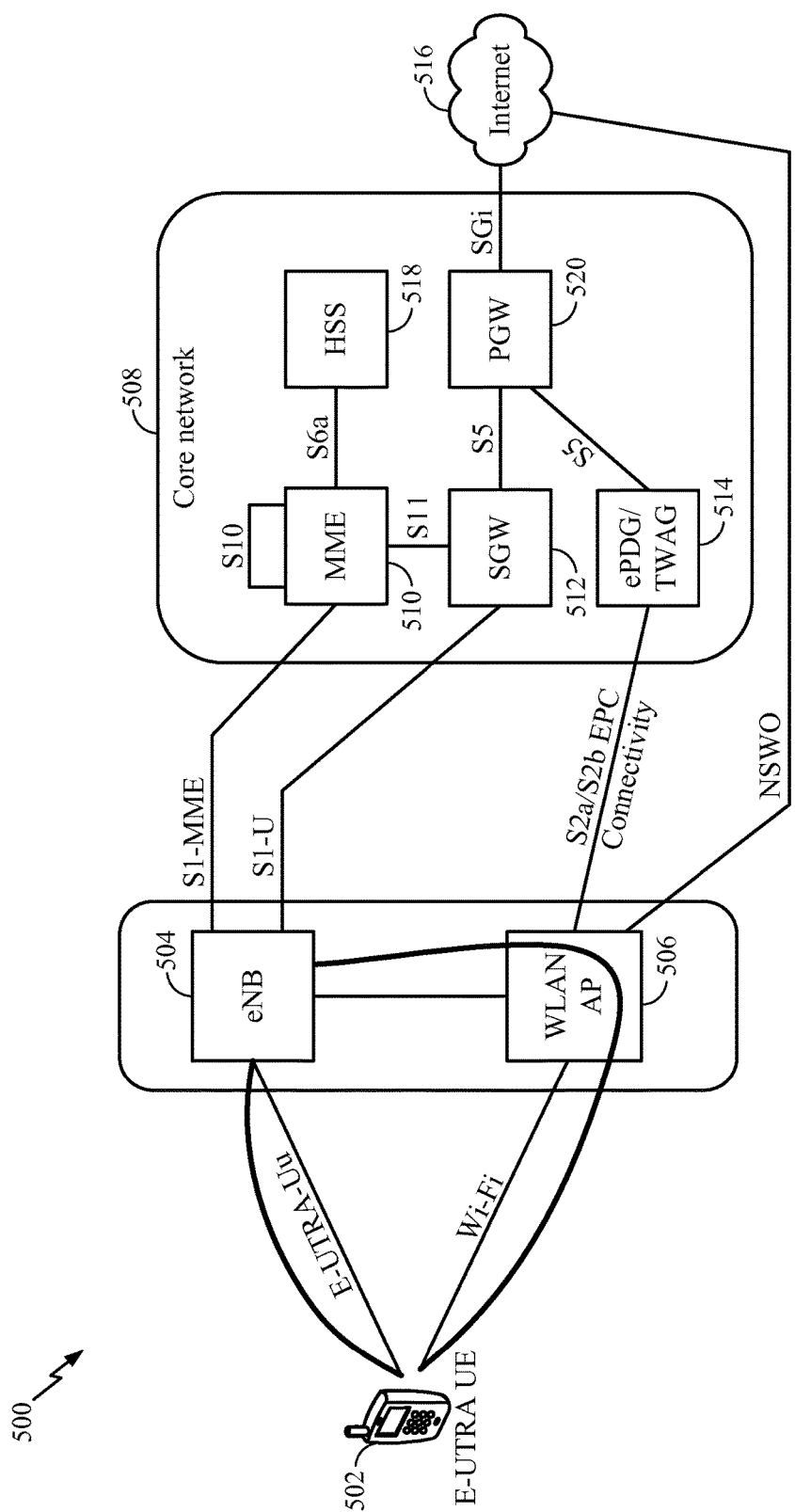
FIG. 5 is a block diagram illustrating an example architecture RAN aggregation using separate EPS bearers terminating at the RAN over an S1 interface, in accordance with certain aspects of the present disclosure.

FIG. 5 is a block diagram illustrating an example architecture 500 RAN aggregation using separate EPS bearers terminating at the RAN over an S1 interface, in accordance with certain aspects of the present disclosure. Access to PDN services and associated applications is provided to the UE 502 (e.g., similar to UE 116 or 122) by EPS bearers. The UE 502 may have a single WLAN interface (e.g., a transceiver capable of WLAN communications).

As shown in FIG. 5, the UE 502 may be served by a collocated eNB 504 (e.g., via a WWAN) and WLAN AP 506 (e.g., via a WiFi network) which are in communication with a core network 508. While FIG. 5 shows an eNB, the BS of the wide-area network may be a UTRAN NodeB, an E-UTRAN eNodeB, an access point, or any other radio node supporting a wide-area wireless network. Similarly, the BS of the local-area network may be a low-power E-UTRAN eNodeB such as a femto node, a WLAN AP, or any other radio node supporting a local-area wireless network.

As shown in FIG. 5, the eNB 504 may communicate with a mobility management entity (MME) 510 in the core network 508 via an S1-MME interface, and the eNB 504 may communication with a serving gateway (SGW) 512 of the core network 508 via an S1-U interface. The WLAN AP 506 may communicate with an evolved packet data gateway (ePDG) 514 or trusted wireless access gateway (TWAG) 514 in the core network 508 via a S2a interface and/or a S2b interface. The WLAN AP 506 may also communicate directly with Internet entities 516 to provide non-seamless WLAN offload (NSWO) of IP traffic between the UE 502 and the Internet entities 516. NSWO may be used to support routing specific IP flows over the WLAN access network without traversing the EPC. Also, inside an EPC is an entity called the access network discovery and selection function (ANDSF) which assists the UE to discover non-3GPP access networks, such as Wi-Fi, that may be used for controlling offloading between 3GPP access networks (such as LTE) and non-3GPP access networks (such as Wi-Fi). The ANDSF may also provide the UE with rules policing the connection to these networks. The MME 510 may communicate with a home subscriber server (HSS) 518 via an S6a interface, and the MME may communicate with the SGW 512 via an S11 interface. The SGW, ePDG, and TWAG may communicate with a packet gateway (PGW) 520 via an S5 interface. The PGW 520 may communicate with Internet entities 516 via an SGi interface.

According to certain aspects, with RAN aggregation a UE may be simultaneously connected to an LTE eNB and a Wi-Fi (i.e., WiFi) AP, which provide radio access links to transport a user's signaling and data traffic, as shown in FIG. 5. While FIG. 5 illustrates a collocated eNB and AP, the eNB and the AP may be logically collocated or non-collocated. In a non-collocated scenario, an interface between the LTE eNB and WiFi AP may enable aggregation procedures. A user's data or signaling bearers may be served by either LTE or WiFi radio links. A data bearer establishes a "virtual" connection between two endpoints so that traffic can be sent between them. It acts as a pipeline between the two endpoints. According to certain aspects, whether to switch bearers may be determined based on the main objectives of serving bearers with a "better" link for each bearer, while maximizing a system utility function. According to certain aspects, the better link may be determined based in part on a user's channel conditions, traffic, and other users sharing the same link.

Figure 6:
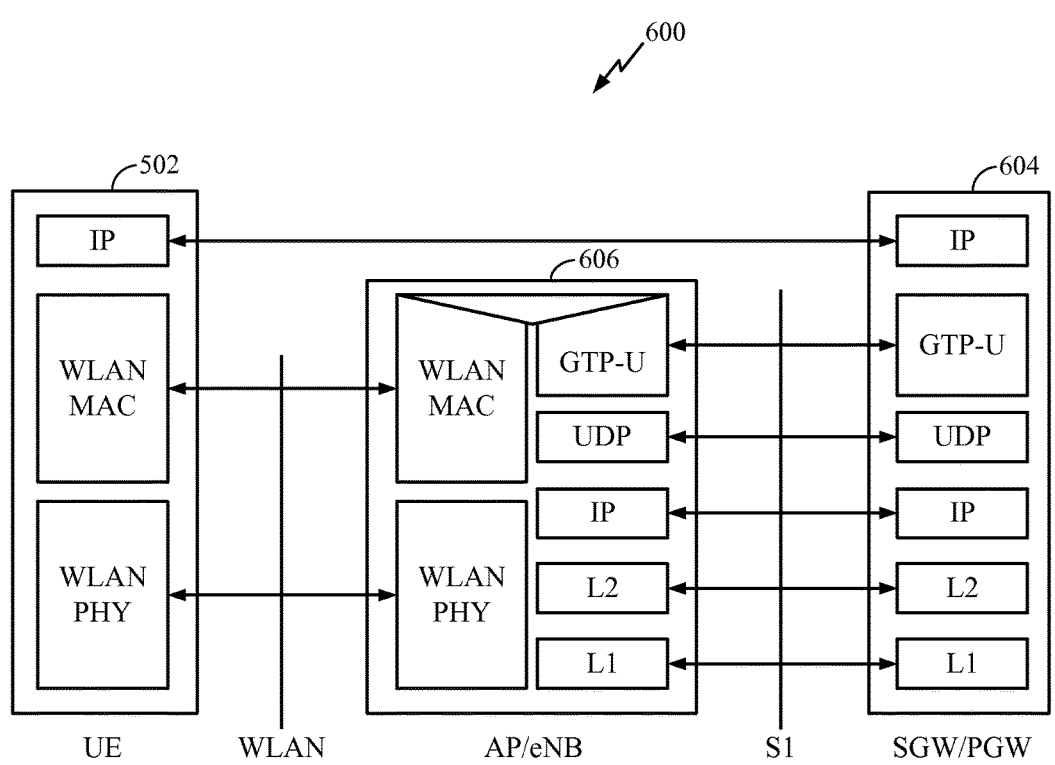
FIG. 6 is a block diagram illustrating an example interface protocol for the user plane between the UE and a gateway for RAN aggregation, in accordance with certain aspects of the present disclosure.

FIG. 6 is a block diagram illustrating an example interface protocol for the user plane 600 between the UE 502 and a gateway 604 (e.g., such as PGW 520 or SGW 512) for RAN aggregation using separate EPS bearers terminating at the RAN, in accordance with certain aspects of the present disclosure. In the example user plane 600, BS 606 (which may be WLAN AP 506 or eNB 504) may share a context through an S1 interface with an SGW or a PGW at a generic packet radio service tunneling protocol user data tunneling (GTP-U) layer, a user datagram protocol (UDP) layer, an IP layer, a layer two (L2) or media access control (MAC) layer, and a layer 1 (L1) or physical layer. The UE 502 may share a context through a WLAN interface with the BS 606 at a WLAN MAC layer and a WLAN physical (PHY) layer. The UE 502 and the gateway 604 may share a context at an upper IP layer.

Realizing Cellular-RAT Type Measurements in WiFi Domain

For LTE-WiFi PDCP aggregation as well as LTE-U, the eNodeB obtains measurement information about the WiFi channel to make decisions about whether (and which) WiFi channel should be used by the UE. In WWAN RAT networks, such as LTE and WCDMA, measurement events may be used to help make handoff decisions. For example, a particular measurement event may be used as an indication to stop looking for other cells as the signal quality of the serving cell is better than a threshold. Measurement objects are objects on which the UE performs the measurements, i.e., frequencies and cells.

In the LTE 3GPP standard, for example, multiple measurement objects are defined, such as A1, A2, A3, A4, and A5 measurement types. These measurement types may be triggered by one or more criteria. The LTE Event A1 is triggered when the serving cell becomes better than a threshold. The LTE Event A2 is triggered when the serving cell becomes worse than a threshold. The LTE Event A3 is triggered when a neighboring cell becomes better than the serving cell by an offset. The LTE Event A4 is triggered when a neighboring cell becomes better than a threshold. LTE Event A5 is triggered when the serving cell becomes worse than a first threshold, while a neighboring cell becomes better than second threshold. In cellular RATs, for purposes of determining when to do IRAT, these measurement objects may be sent from the eNodeB to the user equipment (UE). The UE collects these measurements on serving and neighboring cells of the RATs, and sends measurement reports back to the eNodeB. The eNodeB may then take further actions based on these measurement reports, e.g., instruct the UE to do an IRAT procedure.

Where multiple RATs may be used, for example with LTE-WiFi packet data convergence protocol (PDCP) aggregation or long-term evolution unlicensed (LTE-U), handoff decisions may be made between cellular and WLAN RATs.

While cellular chipsets and technologies may be configured to process measurement objects and make measurements, WiFi chipsets and technologies may not be so configured to handle, or understand, such measurement objects.

Cellular wireless networks may include a number of evolved Node Bs (eNBs). Each eNB may provide communication coverage for a particular geographic area. The term "cell" can refer to a coverage area of an eNB and/or an eNB subsystem serving this coverage area, depending on the context in which the term is used. As noted above, aggregation across multiple RATs may allow a UE to utilize a cellular network and a WLAN. The eNB is able to make decisions as to whether to schedule packets on the cellular network or the WLAN for the UE. Additionally, a serving eNB may determine whether to allow the UE to handover to another eNB based on measurements made by the UE.

In order to make scheduling and handoff decisions, a UE may be configured to perform signal quality measurements and transmit these measurements in measurement reports to the serving eNB. The UE may receive from its serving eNB, signaling configuring the UE to perform measurement reporting. This signaling may be, for example, dedicated signaling, such as by RRC signaling, or another signaling technique, and may include measurement objects and reporting configurations. These measurement objects indicate what the UE should measure, such as the frequencies and cells, both serving and neighboring. The reporting configuration indicates when the UE should send a measurement report.

Measurement reports may be event driven and may be predefined in the standard. For example, the LTE standard defines events A1, A2, A3, A4, A5, and A6, which trigger measurement reports based upon the occurrence of specific events. These measurement reports may be used by a serving cell as a part of determining, for example, whether to attach to a particular WLAN network, schedule packets on the WLAN network, or allow a UE to handover to another cell or switch to another RAT.

As noted above, aggregation across multiple RATs may allow a UE to utilize a cellular network and a WLAN. Generally, WLAN does not understand or include the concept of measurement events. As such LTE measurement events may be translated or converted into a concepts and formats understood or supported by WLAN.

As discussed in more detail later, in conjunction with FIG. 16, in some cases, a UE may translate a request for measurement reports associated with a first radio access technology (RAT) to a group of requests for measurement associated with a second RAT. This translation may allow established measurement reporting protocols for the first RAT (e.g., LTE) to be used for measurements taken in another RAT (WiFi).

In certain aspects, a measurement object may be received, for example, by a cellular modem, via RRC or other cellular signaling. In one example, the signaling is 3GPP RRC signaling received over the air. After reception, the measurement object may be converted into commands or messages formatted to be compatible with a higher-level operating system (HLOS), i.e., that an HLOS component understands. The HLOS component may be executed on, for example, an application processor or WiFi chipset or modem. The cellular modem sends a request(s) for WiFi measurements and the applications processor, WiFi chipset, or modem responds with the measurement reports.

Figure 7:
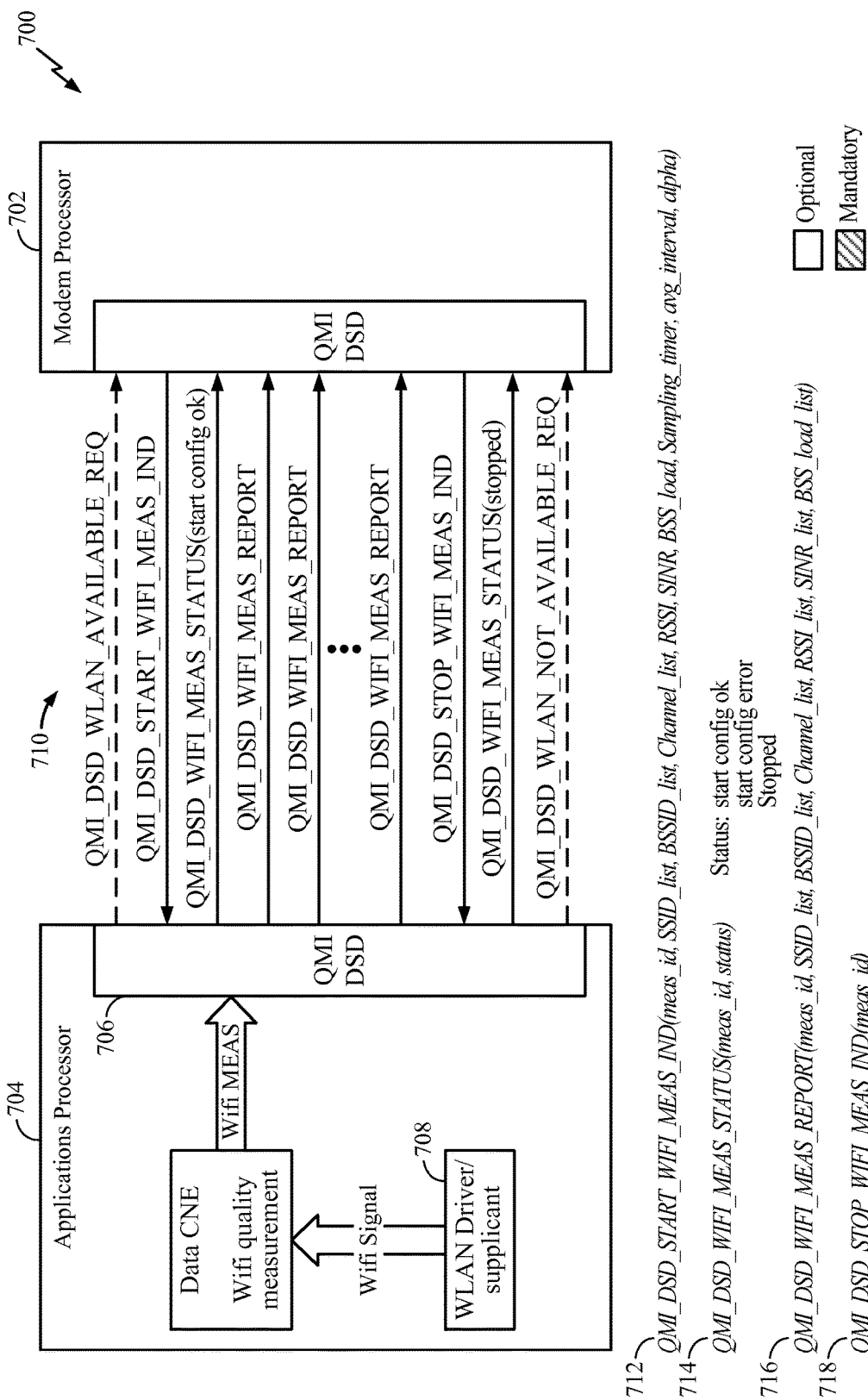
FIG. 7 illustrates an example message exchange, in accordance with certain aspects of the present disclosure.

FIG. 7 illustrates an example message exchange 700, in accordance with certain aspects of the present disclosure. According to certain aspects, messages may be exchanged between a cellular modem and cellular modem processor 702 and an applications processor 704. In this example, a WiFi modem is attached to the applications processor 704 and communicates with the applications processor 704 via an interface 706 using WiFi driver and supplicant 708 residing on the applications processor 704. In other embodiments a separate WiFi modem may communicate with the applications processor via an interface, WiFi driver and supplicant, or the WiFi modem chipset may include some or all of the functionality of the applications processor.

The cellular modem processor 702 may receive a measurement object via RRC or other cellular signaling. The cellular modem processor 702 decodes the measurement object and sends one or more measurement messages 710 requesting WiFi measurements. The application processor responds with measurement reports. The cellular modem 702 also receives messages from the applications processor 704, for example, in response to the one or more measurement messages 710 or a measurement report. The measurement messages, as detailed below, may also include status messages, such as those indicating that a WLAN connection is available for use or not available.

A measurement request is sent from NW to UE over cellular transport and in a format that cellular technology processors understands (ex. first RAT). Measurement messages may also include various parameters the cellular modem 702 is interested in. For example, a WiFi measurement request message 712, such as QMI_DSD_START_WIFI_MEAS_IND may include parameters, such as meas_id, SSID_list, BSSID_list, Channel_list, RSSI, signal to noise ratio (SINR), BSS_load, Sampling_timer, avg_interval, and alpha, for performing measurements or indicating the measurements to be taken. These parameters may include information that the cellular modem is interested in such as, a measurement ID (meas_id), a listing of the service set identifiers (SSIDs) (SSID_list) and BSS identifiers (BSSIDs) (BSSID_list) available, the WLAN channels available (Channel_list), as well the actual measurements that the cellular modem is interested in, such as RSSI, signal to noise plus interference ratio (SINR), BSS_load, sampling timing information, the interval at which the measurement report should be returned to the cellular modem (avg_interval), an alpha for use in various formulas for averaging, and other WLAN network measurements that may be used by the cellular modem.

Similarly, a WiFi status message 714, such as QMI_DSD_WIFI_MEAS_STATUS, may include parameters indicating the measurement ID (meas_id), along with a status message indicating, for example, that the configuration was successfully started, or stopped, or whether an error was encountered. The measurement report message 716, such as QMI_DSD_WIFI_MEAS_REPORT, may include, as parameters the information requested in the WiFi measurement start message 712. The WiFi measurement stop message 718, QMI_DSD_STOP_WIFI_MEAS_IND, may include a parameter indicating the measurement ID (meas_id).

Figure 10:
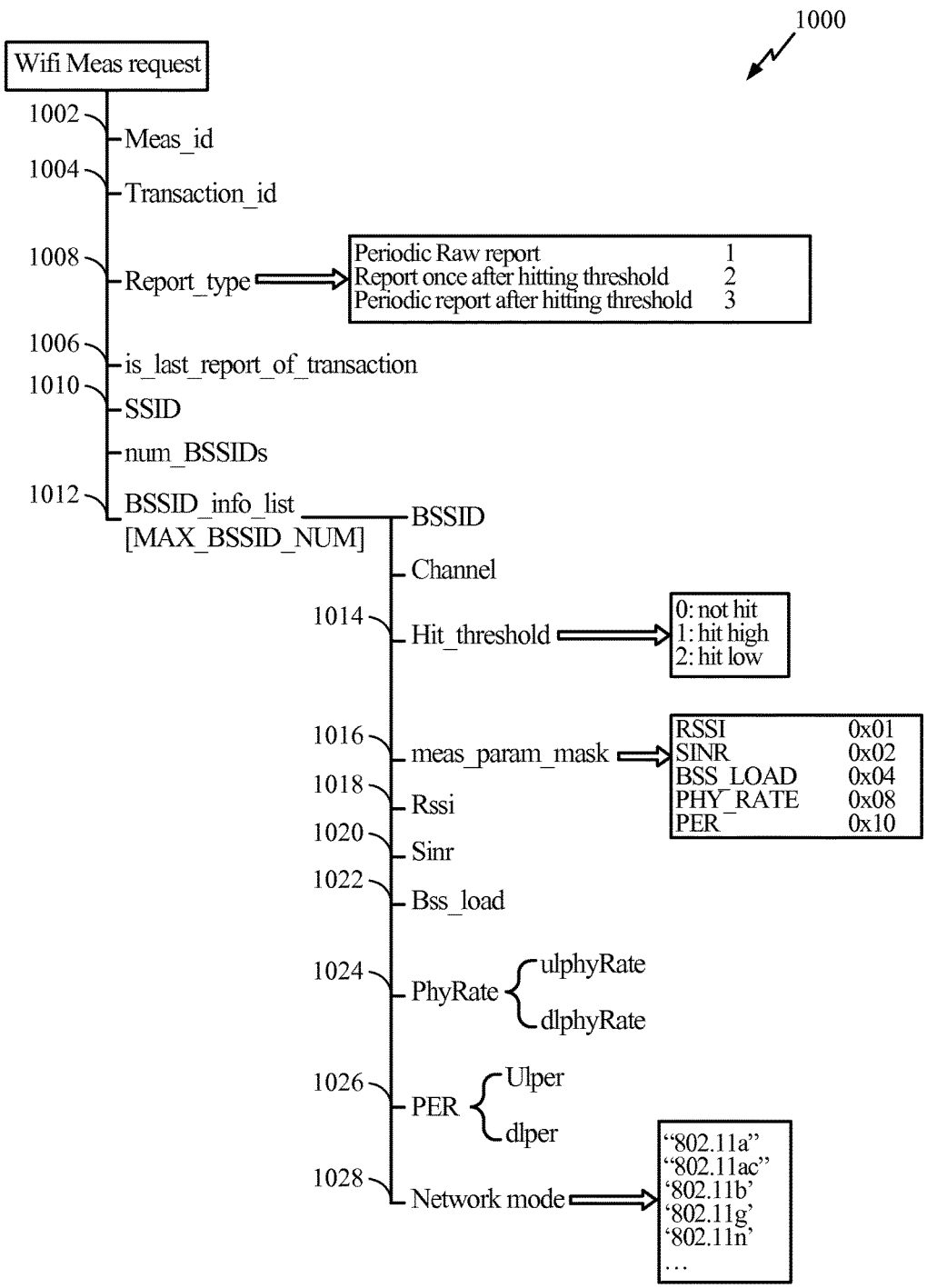
FIG. 10 illustrates an example measurement report message, in accordance with certain aspects of the present disclosure.
Figure 11:
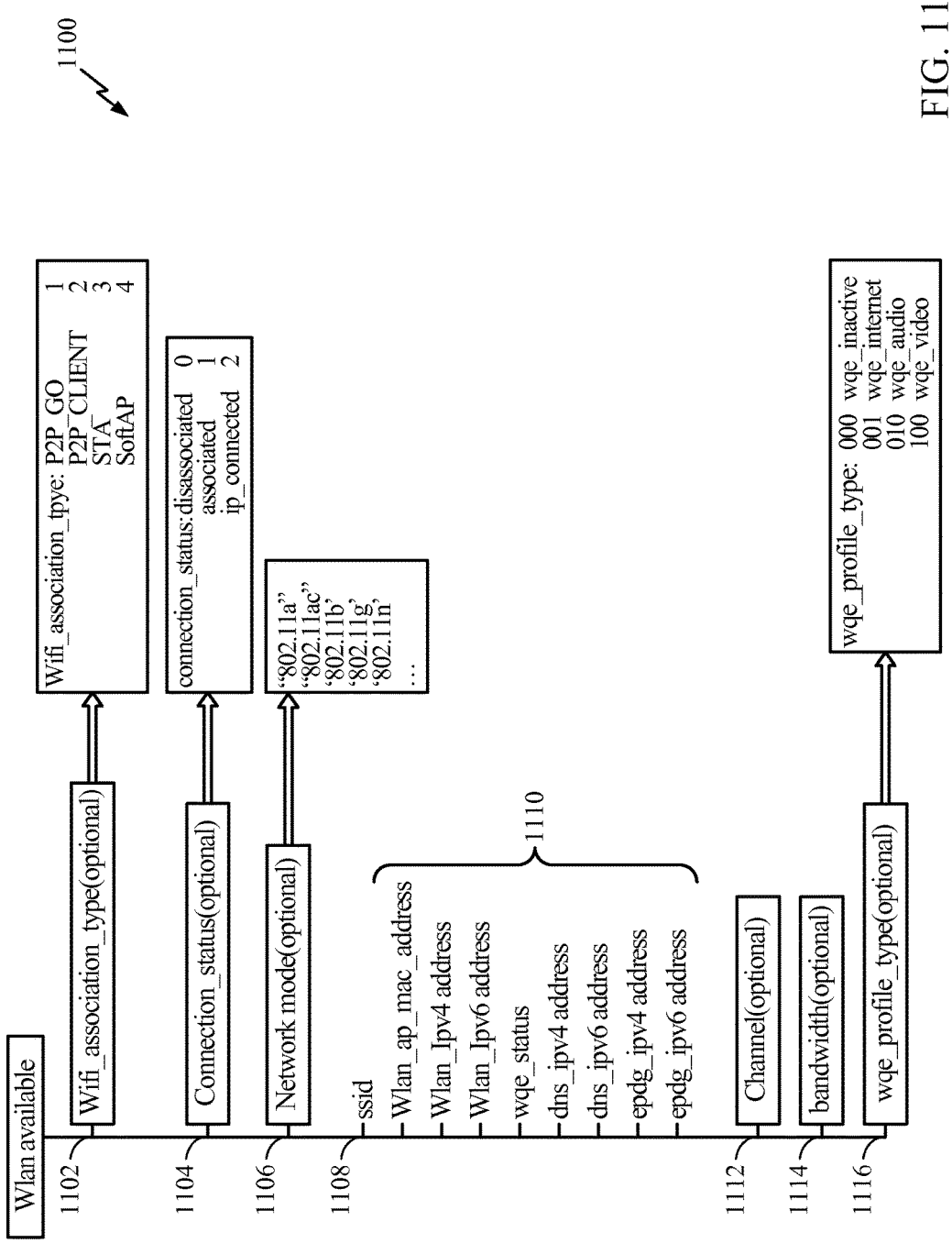
FIG. 11 illustrates an example WLAN available message format, in accordance with certain aspects of the present disclosure.

Other messages and parameters are more fully discussed herein in conjunction with specific measurement objects. The format of these messages is shown in FIGS. 9, 10, and 11 and may be published to WiFi chipsets and Applications Processors.

Figure 8:
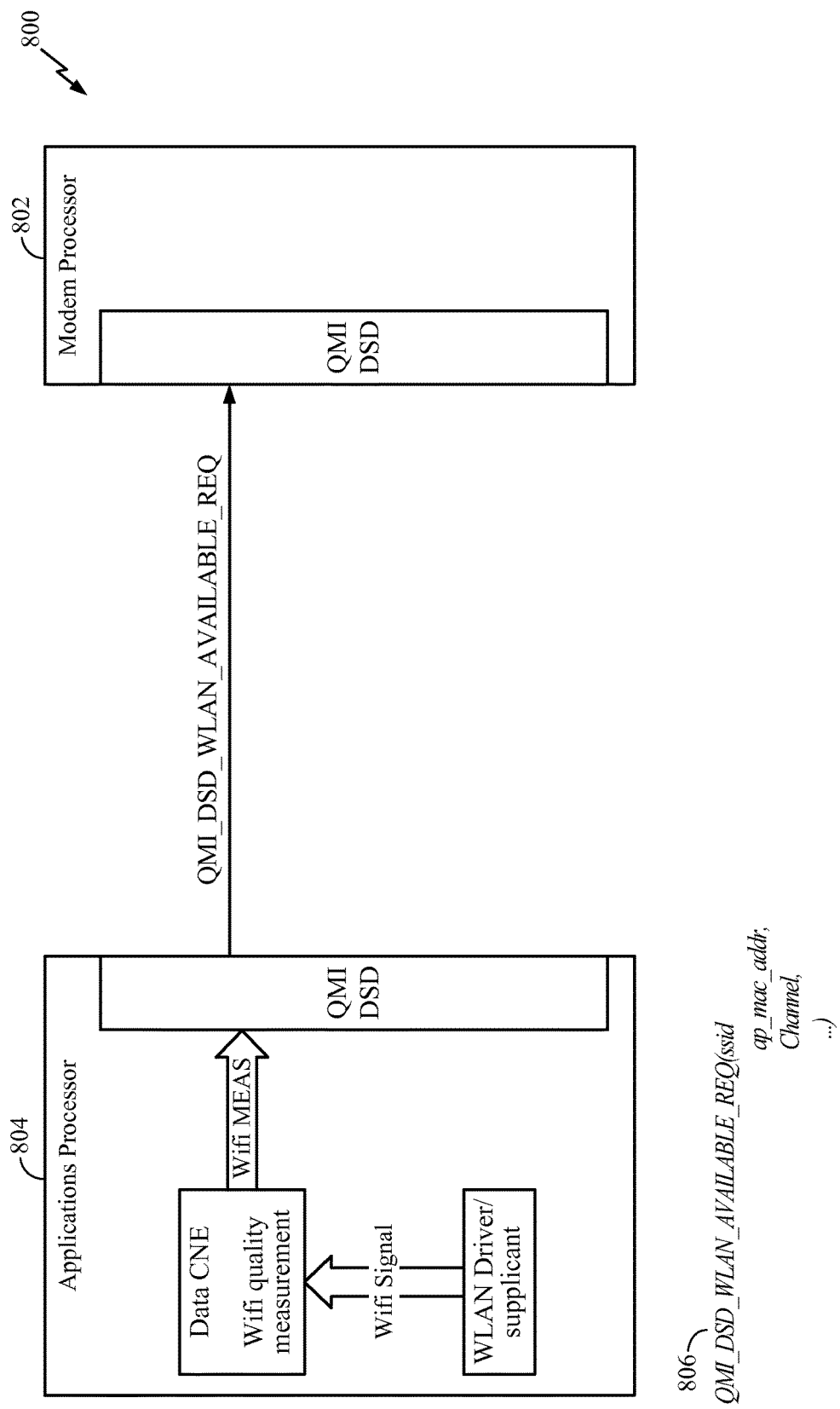
FIG. 8 illustrates an example WLAN available message exchange, in accordance with certain aspects of the present disclosure.

FIG. 8 illustrates an example WLAN available message exchange 800, in accordance with certain aspects of the present disclosure. A WLAN available message 806, such as QMI_DSD_WLAN_AVAILABLE_REQ, may be sent from the application processor 804 to the cellular modem 802, indicating that a WLAN is connected and available for use. There can be different types of usage such as Station mode, Hotspot mode, Peer2PeerMode, etc. The message may include parameters indicating, the WLAN SSID, the MAC address of the connected access point (ap_mac_addr), channel information (channel), and other information related to the connected WLAN when in use.

FIG. 9 illustrates an example WiFi measurement request message 900 format, in accordance with certain aspects of the present disclosure. The WiFi measurement request message 900 has an ID, Meas_id, in the beginning. Also as discussed in conjunction with FIG. 7, a WiFi measurement request message 900 may be sent by the cellular modem to request setting up measurement reporting and may include various parameters. These parameters may, for example, specify the measurement information requested by the cellular modem. According to certain aspects, the WiFi measurement request message 900 may include a measurement parameter bit mask 902 (meas_param_mask) for requesting one or more characteristic of the WLAN connection to be measured. These characteristics may include, but are not limited to, a measured RSSI, SINR, BSS_load information, physical layer bit rate (PHY_Rate), and packet error rate (PER).

According to certain aspects, the WiFi measurement request message 900 may specify a parameter for a reporting type 904 (Report_type) to be performed. For example, a periodic report may be requested starting at the present time, or after a particular threshold is met. A limit on the number of periodic reports may also be specified. A one-time report may also be requested after a particular threshold is met. Various parameters for thresholds, such as RSSI_Threshold 906, SINR_Threshold 908, BSS_LOAD_Threshold 910, other backhaul load thresholds, etc., may also be specified in the WiFi measurement request message 900. These thresholds may be based on, for example, a RSSI value, a SINR value, or BSS load information, such as a count of the number of stations, channel utilization metrics, or admission capacities for the WLAN. Thresholds may include a high threshold value, such as an RSSI threshold high value, RSSI_high, which specifies that the threshold is met when the measured value goes above the threshold value, or a low threshold value, such as an RSSI threshold low value, RSSI_low, which specifies that the threshold is met when the measured value goes below the threshold value.

In certain aspects, parameters relating to sampling and reporting may be specified. For example, a sampling timer parameter 912 (Sampling_timer) is a field which may specify the frequency at which particular measurements are to be made. A report interval parameter 914 (Report_interval) may specify the frequency at which reports are sent for periodic reports. For example, the reports may be sent once every five seconds, or once every ten seconds for a periodical report. A time-to-trigger parameter 916 (Time_to_trigger) may be provided to allow for a level of hysteresis to delay sending reports for a certain time period to prevent ping-pong effects.

In certain aspects, additional parameters related the SSIDs may be specified. For example, SSID information parameter 918 (ssid_info_list) may comprise an indication of the SSIDs that the cellular modem is interested in monitoring. This SSID indication may be in the form of a bitmask 920 identifying the SSIDs of interest. For example, information for only the connected SSID may be requested via the mask 0x00 . . . 00. Alternatively, SSIDs information for any detected SSID may be requested via the mask 0xFF . . . FF, or SSID information only for a particular specified SSID may be requested via the mask 0xbbb, where bbb identifies the specific SSID. Similar to SSID information parameter 918 BSSID information 922 (bssid_info_list) and channel information 924 (channel_info_list) may be requested by the cellular modem with a bitmask. Additionally, the WiFi measurement request message 900 may include a parameter requesting information for hidden SSIDs 926 (Is_hidden).

FIG. 10 illustrates an example measurement report message 1000, in accordance with certain aspects of the present disclosure. A WiFi measurement request may install a measurement request on an applications processor, which then monitors the WLAN connections. The applications processor may return, to the cellular modem, a measurement report message 1000 in response. The measurement report message 1000 may include a measurement id 1002, a transaction ID 1004, and an indication 1006 that the report is the last report of a transaction. This transaction ID 1004 and indication 1006 may be used when a particular measurement report message 1000 runs into size limitation and must be split into multiple messages.

Similar to the WiFi measurement request 900, the measurement report message 1000 may indicate the type of reporting 1008 being performed on a specific SSID 1010. The measurement report may include a list of BSSIDs 1012 similarly to the WiFi measurement request 900. Additionally, information 1014 regarding whether the threshold was hit may be reported. This information 1014 may indicate whether a threshold was met, and if met, whether the high or low threshold was met. The measured parameter bit mask 1016 (meas_param_mask) is a bitmask indicating which measured characteristic of the WLAN connection is included in the report. These characteristics may include, but are not limited to, RSSI 1018, SINR 1020, BSS load 1022, PHYRate 1024, and PER 1026. The PHYRate 1024 and PER 1026 parameters may also include separate fields detailing upload and download rates. The network mode field 1028 may indicate the type of the WLAN network (i.e., if the WLAN is an 802.11a, 802.11b, etc. type network).

FIG. 11 illustrates an example WLAN available message 1100 format, in accordance with certain aspects of the present disclosure. As discussed in conjunction with FIG. 8, the WLAN available message 1100 may be sent by the applications processor to the cellular modem indicating that a particular WLAN is connected or available for use. The WLAN available message 1100 may include various parameters containing information related to the particular WLAN. These parameters may include, for example, an association type 1102 (Wifi_association_type), an indication of the connection status 1104 (Connection_status), a network mode 1106 (Network_mode), an SSID 1108, various MAC and IP addresses 1110, channel information 1112, bandwidth information 1114, and a parameter related to WiFi quality estimation profiles (wqe_profile) 1116.

The WiFi association type parameter 1102 may indicate the type of WiFi network connected or available, such as whether the WiFi network is a hotspot (SoftAP), a peer-to-peer (P2P) connection (as a P2P group owner (P2P_GO) and P2P_Client), or and access point coordinated WiFi network (STA). The connection status 1104 may indicate whether the applications processor is associated with the particular WLAN, disassociated, or connected with an IP address. Similar to the WiFi measurement request 900, the network mode field 1106 may indicate the type of the WLAN network (i.e., if the WLAN is an 802.11a, 802.11b, etc., type network). The SSID parameter may identify the SSID associated with the particular WLAN. Various MAC and IP addresses 1110 associated with the particular WLAN may be reported when connected.

As discussed above, in cellular systems, eNB is able to make decisions as to whether to schedule packets on the cellular network or the WLAN for the UE and the UE may be configured to perform signal quality measurements in order to facilitate the eNB decision making process. The LTE standard defines multiple events which may trigger measurement reporting that a UE may be configured for. However, WLAN standards typically do not include defined events and events which are translated into WLAN concepts in order to provide similar measurement reports for the WLAN network as for cellular networks.

Methods to Translate Individual Cellular Measurement Objects into Interface Methods In the cellular world, measurement reports are sent from UE to the both neighbor and serving eNodeBs for various technologies. In one example, it is for Inter-RAT purposes. The requests from network for measurements are specified in the LTE 3gpp standards as A1, A2, A3, A4, and A5. However, WiFi chipsets and technologies may not be so configured to handle, or understand, such measurement requests. So these messages received on cellular may be "translated" into messages that adhere to WiFi concepts so they can be understood and applied by WiFi chipsets. The methods to translate A1-A5 messages received over the air from an eNodeB to the interface messages that adhere to common WiFi is part of the solution. The translation happens, for example, within a UE's cellular modem processor, which converts WWAN (i.e., a first RAT) objects or commands into ones which a WLAN can understand (i.e., a second RAT) The following sections disclose a) a first recap of what each of the measurement objects A1-A5 mean, b) a flow-chart of the method used to convert the message requests into a group of interface messages, c) show the values entered for the message request(s) and response(s)), and d) show a callflow of messages exchanged.

Figure 12A:
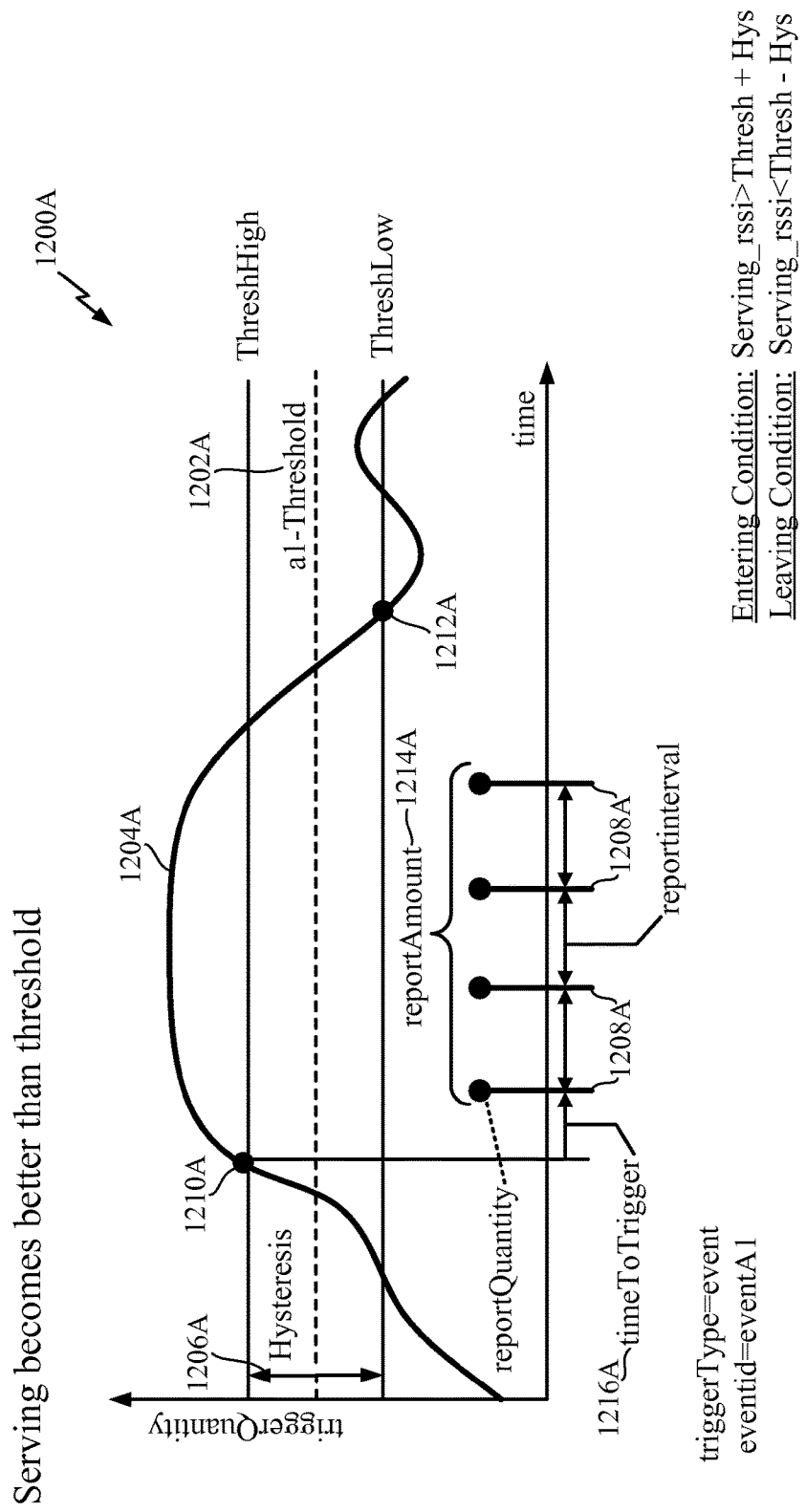
FIGS. 12A, 13A, 14A, and 15A illustrate conceptual diagrams of A1, A2, A4, and A5 measurement objects, in accordance with certain aspects of the present disclosure.

FIG. 12A illustrates a conceptual diagram of an A1 measurement object 1200A, in accordance with certain aspects of the present disclosure. The A1 event may be based on a received signal quality measurement and may be triggered when the serving cell's signal quality 1204A becomes better than an A1 threshold 1202A. In LTE, an amount of hysteresis 1206A may be defined to avoid ping-pong effects, and reporting 1208A is triggered 1210A (e.g., entering conditions are met) after the serving cell's signal quality exceeds the A1 threshold 1202A level plus the amount of hysteresis 1206A. Several reports may be sent, indicating that A1 has been met. Likewise, reporting is cancelled (e.g., leaving conditions/exit criteria are met) after the serving cell's signal quality falls below the A1 threshold 1202A, minus the amount of hysteresis 1206A. A total number of reports (i.e. reportAmount) 1214A to send may also be set for a periodic report. Here the report amount is set to four, and the WWAN receives four reports from the WLAN after the A1 triggering condition is met. In addition a reporting interval representing the amount of time between reports, and a time to trigger 1216A representing the length of time from when the entering condition is met and a first report may be set. So if the received signal quality measurement is greater than the A1 threshold plus hysteresis and the time to trigger passes, then the A1 condition has been met.

Figure 12B:
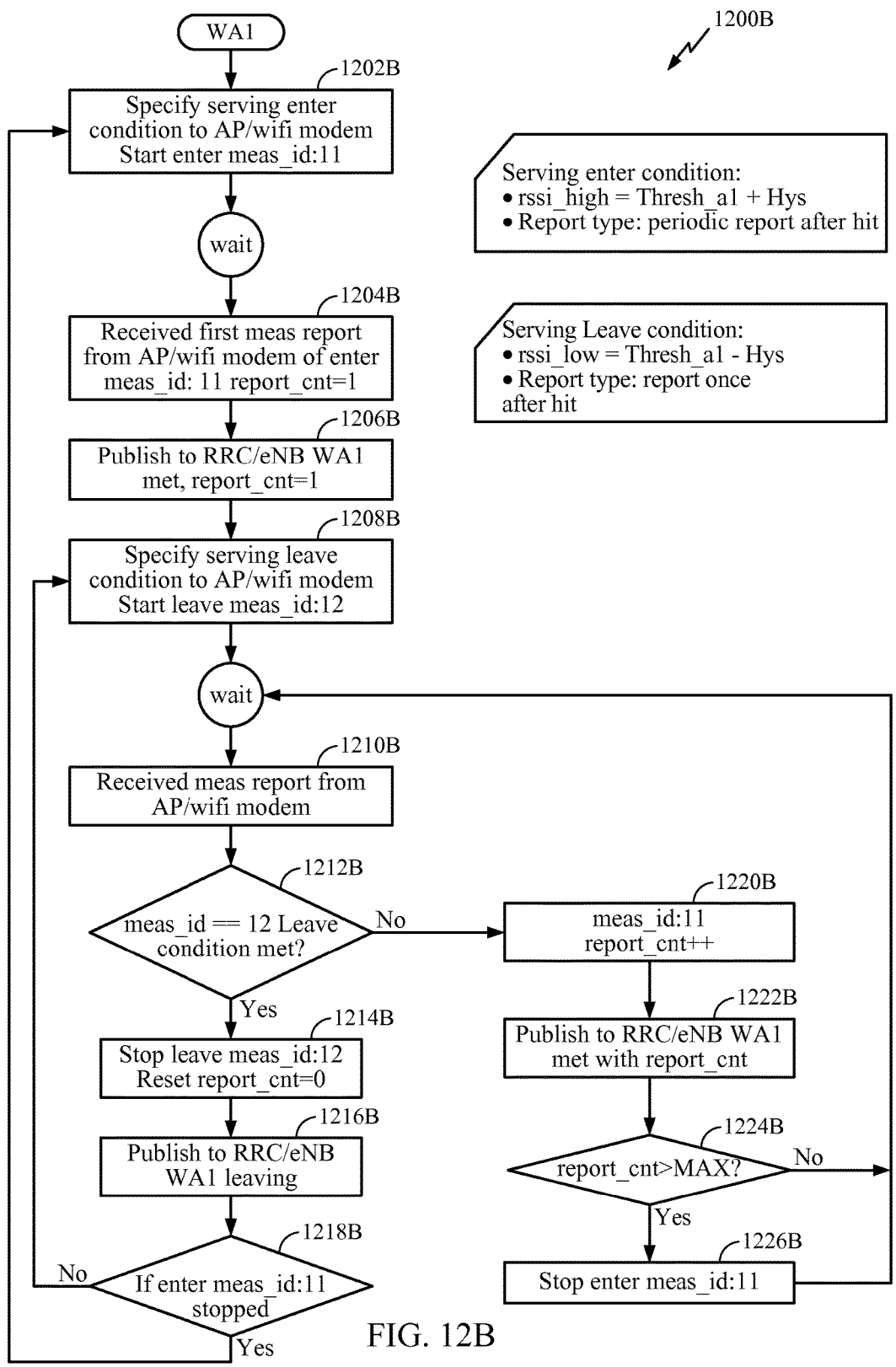
FIGS. 12B, 13B, 14B, and 15B illustrate example flow diagrams of A1, A2, A4, and A5 measurement object translation, in accordance with aspects of the present disclosure.

FIG. 12B illustrates an example flow diagram of an A1 measurement object translation 1200B, in accordance with aspects of the present disclosure. The A1 condition is specified in the message and sent to the AP. After reception of an A1 measurement object, the A1 measurement object may be translated into WLAN concepts so the A1 measurement object may be understood by the WLAN. At step 1202B, entering conditions for A1 reporting may be specified. The enter condition is shown in the block on the right and man contain at least one parameter indicative of channel quality in the WLAN. The entering conditions may be specified as a specific RSSI value, rssi_high, where rssi_high is equal to the A1 threshold 1202A plus the amount of hysteresis 1206A. A first WiFi A1 measurement request may be sent, for example, to the applications processor or WiFi modem, from the cellular modem containing the entering conditions, an entering measurement ID (e.g., meas_id:11), along with a reporting type (e.g., Report_type) requesting periodic reports after the rssi_high threshold is met. The entering measurement ID may be specific to WLAN A1 entering conditions.

At 1204B, after the entering conditions are met, the first report is received with a measurement ID matching the entering measurement ID of the first WiFi A1 measurement request and a report count of 1, indicating that the first report is the first measurement report after the entering conditions are met. At 1206B, the first report is output to the cellular modem for transmission to the eNB.

At 1208B, leaving conditions for A1 reporting may be specified. The leaving conditions may be specified as a specific RSSI level, rssi_low, where rssi_low is equal to the A1 threshold 1202A minus the amount of hysteresis 1206A. A second WiFi A1 measurement request may be sent containing the leaving conditions, a leaving measurement ID (e.g., meas_id:12), along with a reporting type requesting a single report after the rssi_low threshold is met. The leaving measurement ID may be specific to WLAN A1 leaving conditions.

The measurement report for the AP may be two-fold. After the receipt of a next report at 1210B from the AP/WiFi modem, the measurement ID of the next report is checked against the leaving measurement ID of the second WiFi A1 measurement request for a match at 1212B. If there is a match, then the leaving conditions have been met. At 1214B, a WiFi measurement stop message having a measurement ID matching the leaving measurement ID of the second WiFi A1 measurement request may be sent. The report count may also be reset to zero. At 1216B a report indicating that A1 reporting has stopped is output to the cellular modem for transmission to the eNB. At 1218B, a check is performed to determine if the reporting associated with the entering condition has been stopped, for example, if a specified maximum number of reports have been reached. If the reporting associated with the first WiFi A1 measurement request has been stopped, then execution returns to the entering state. If the reporting associated with the first WiFi A1 measurement request has not been stopped, then execution loops to 1208B and leaving conditions for A1 reporting may be specified again.

If the check at 1212B indicates that the measurement ID matches that of the entering measurement ID of the first WiFi A1 measurement request, at step 1220B, the report count is incremented. At step 1222B, the next report is output to the cellular modem for transmission to the eNB. At step 1224B, the report count may be checked against the specified maximum number of reports. If the report count is less than the maximum number of reports, execution proceeds to wait for the next measurement report. At step 1226B, if the report count is greater than or equal to the specified maximum number of reports, then a WiFi measurement stop message having a measurement ID matching the entering measurement ID of the first WiFi A1 measurement request (meas_id: 11) may be sent. Execution then proceeds to wait for the next measurement report.

Figure 12C:
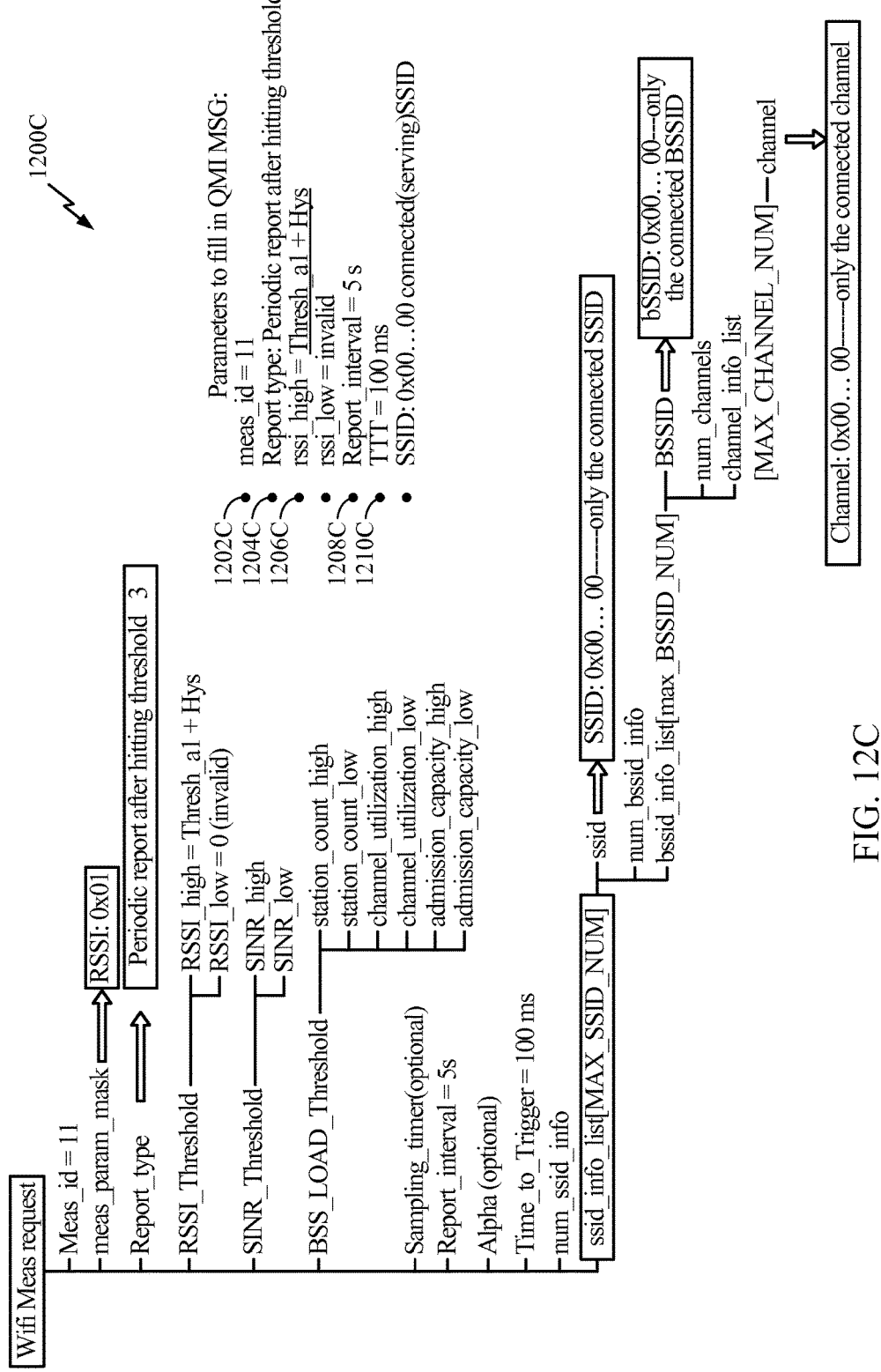
FIGS. 12C-12D, 13C-13D, 14C-14D, and 15C-15F illustrate example WiFi A1, A2, A4, and A5 measurement request messages, in accordance with certain aspects of the present disclosure.

FIG. 12C illustrates an example WiFi A1 measurement request message 1200C, in accordance with certain aspects of the present disclosure. In certain aspects, the WiFi A1 measurement request message 1200C may correspond with the first WiFi A1 measurement request associated with entering conditions, as discussed in conjunction with 1202B in FIG. 12B. In certain aspects, the WiFi A1 measurement request message 1200C may include a measurement ID parameter 1202C specific to WLAN A1 entering conditions. The WiFi A1 measurement request message 1200C may also include a report type parameter 1204C indicating that periodic reports should be sent after a threshold is met. A high threshold value 1206C is then provided, here rssi_high, and an invalid or no low threshold value is provided. The WiFi A1 measurement request message 1200C may also include a reporting interval 1208C and a time to trigger 1210C parameters. Additionally, the SSID, BSSID, and Channel parameters may be configured to indicate that reporting is to be performed for a connected SSID, BSSID, and Channel, respectively.

Figure 12D:
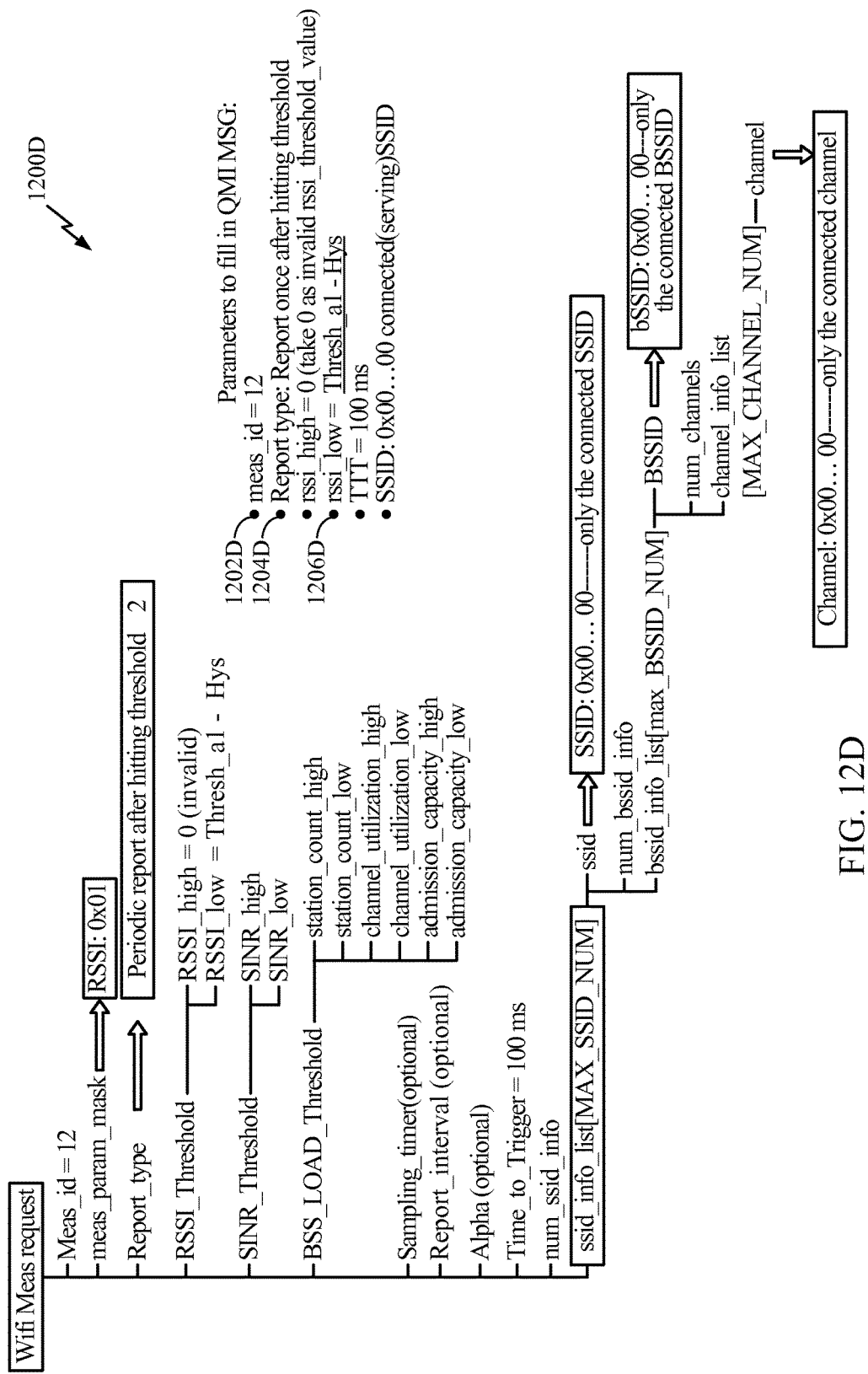

FIG. 12D illustrates an example WiFi A1 measurement request message 1200D, in accordance with certain aspects of the present disclosure. In certain aspects, the WiFi A1 measurement request message 1200D may correspond with the second WiFi A1 measurement request associated with leaving conditions, as discussed in conjunction with 1208B in FIG. 12B. In certain aspects, the WiFi A1 measurement request message 1200D may include a measurement ID parameter 1202D specific to WLAN A1 leaving conditions. The WiFi A1 measurement request message 1200D may also include a report type parameter 1204D indicating that a single periodic report should be sent after a threshold is met. A low threshold value is then provided for the threshold parameter 1206D, here rssi_low, and an invalid or no high threshold value is provided. Other parameters may be configured similarly to the first WiFi measurement request.

Figure 12E:
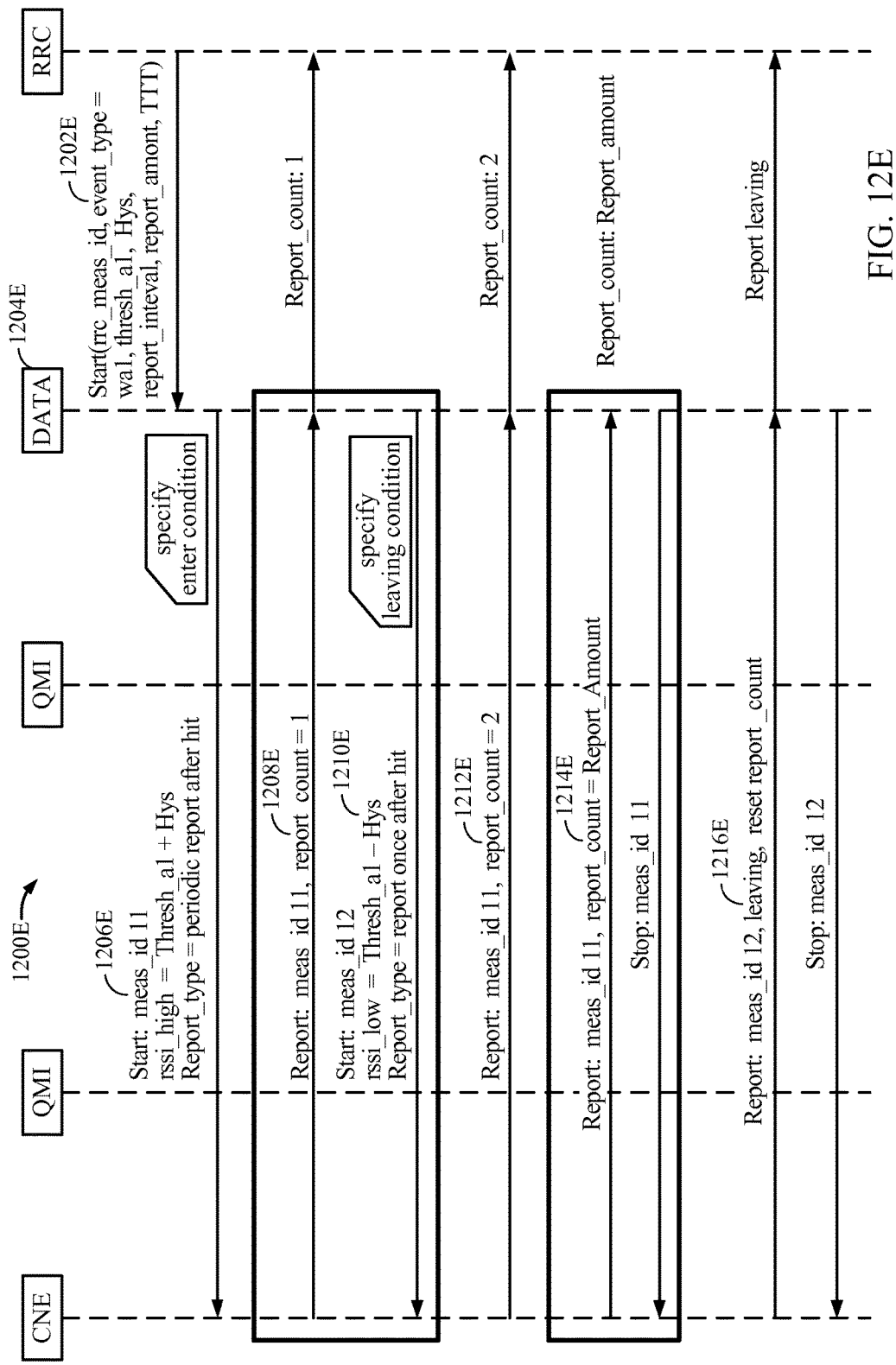
FIGS. 12E, 13E, 14E, and 15G-15H illustrate example WiFi A1, A2, A3, A4, and A5 measurement call flows, in accordance with certain aspects of the present disclosure.

FIG. 12E illustrates an example WiFi A1 measurement call flow 1200E, in accordance with certain aspects of the present disclosure. At 1202E, an A1 measurement object translated into WLAN concepts may be received, for example, by a data module 1204E within the applications processor. The data module 1204E may generate the first WiFi A1 measurement request with specified entering conditions, as discussed conjunction with FIG. 12C. At 1206E, the first WiFi A1 measurement request may be sent to the connectivity engine (CNE), as discussed in conjunction with 1204B of FIG. 12B. At 1208E, the first report is received from the CNE, as discussed in conjunction with 1204B, and outputted, as discussed in conjunction with 1206B of FIG. 12B. At 1210E, the second WiFi A1 measurement request may be sent to the CNE, as discussed in conjunction with 1208B of FIG. 12B. At 1212E, a second report is received from the CNE and outputted. This second report may also be associated with the first WiFi A1 measurement request through the meas_id. The report count may be incremented to reflect the total number of reports generated in response to the first WiFi A1 measurement request.

At 1214E, a third report may be received from the CNE having a report count equal to the specified maximum number of reports and a WiFi measurement stop message may be sent in response, as discussed in conjunction with step 1226B of FIG. 12B. At 1216E, a fourth report may be received from the CNE having a measurement ID matching the leaving measurement ID of the second WiFi A1 measurement request, as discussed in conjunction with 1214B of FIG. 12B, and outputted. In response, a WiFi measurement stop message with a measurement ID matching the leaving measurement ID of the second WiFi A1 measurement request may be sent.

Figure 13A:
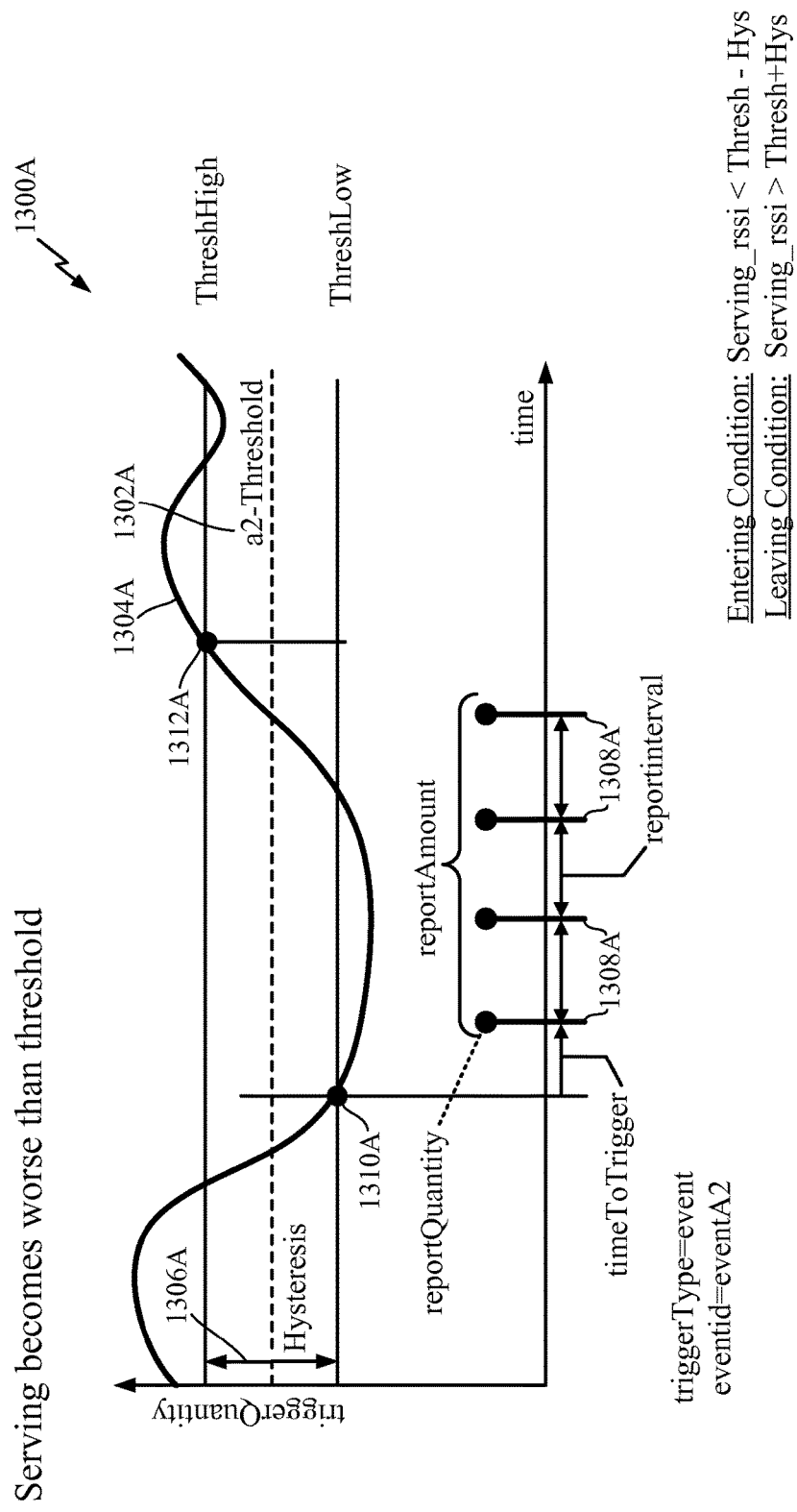

FIG. 13A illustrates a conceptual diagram of an A2 measurement object 1300A, in accordance with certain aspects of the present disclosure. The A2 event may also be based on a received signal quality measurement and may be triggered when the serving cell's signal quality 1304A becomes worse than an A2 threshold 1302A, and remains lower for a time to trigger duration. That is, the A2 measurement object is similar to an A1 measurement object except that the A2 measurement object is triggered when signal quality of the serving cell falls below a threshold, rather than exceeding a threshold. As with the A1 measurement object, an amount of hysteresis 1306A may be defined to avoid ping-pong effects, and reporting 1308A is triggered 1310A (e.g., entering conditions are met) after the serving cell's signal quality falls below the A2 threshold 1302A level minus the amount of hysteresis 1306A. Likewise, reporting 1308A is cancelled (e.g., leaving conditions are met) after the serving cell's signal quality exceeds the A2 threshold 1302A, plus the amount of hysteresis 1306A at 1312A. As with the A1 measurement object 1200A, a total number of reports, reporting interval, and time to trigger may also be set. For example, the UE will send RSSI based meas reports for every 5 ms interval with reporting amount=4 after TTT=100 ms upon satisfying the entering condition until the leaving condition. When leaving condition is met, UE resets reportAmount to 0.

Figure 13B:
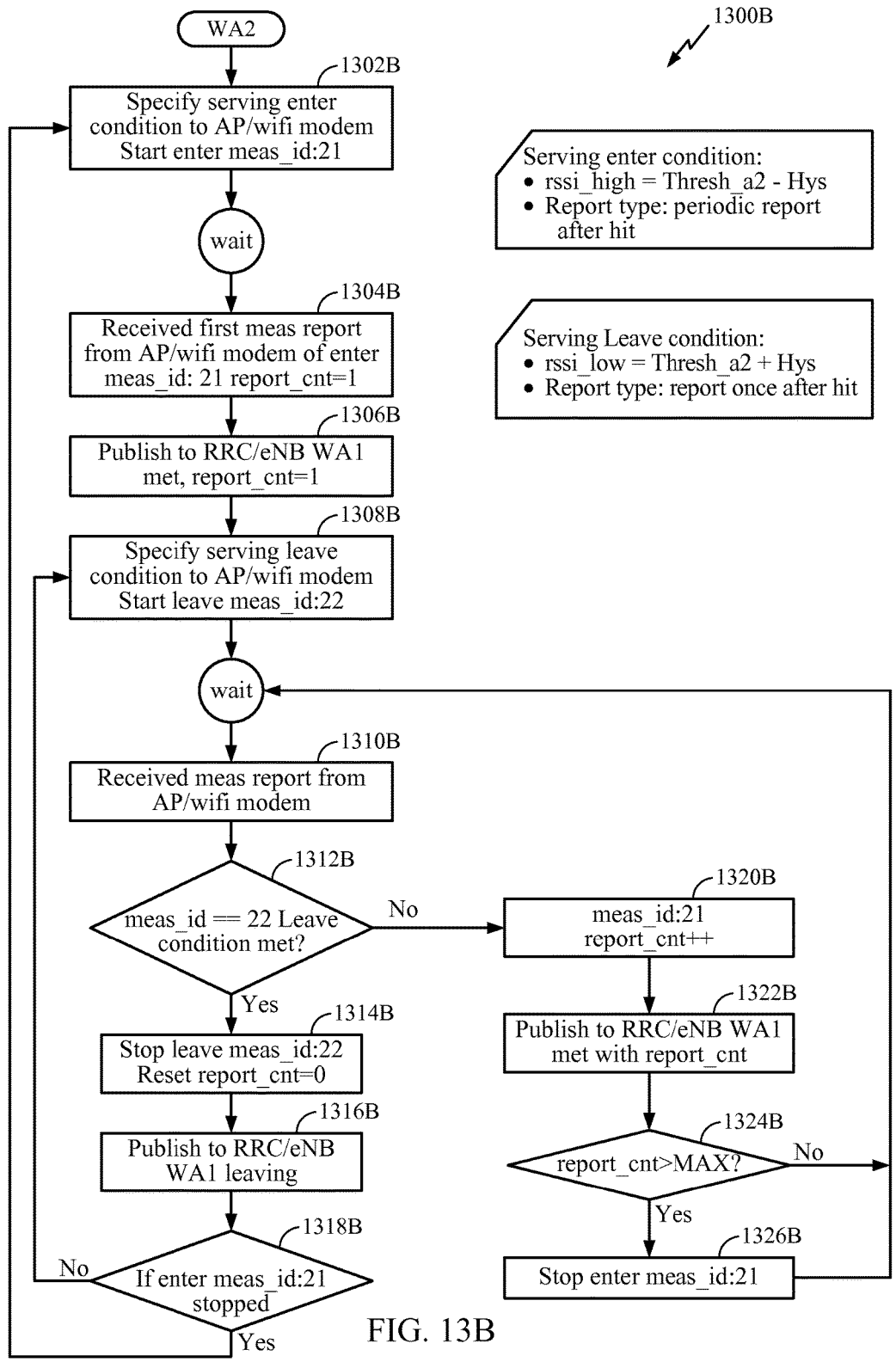

FIG. 13B illustrates an example flow diagram of an A2 measurement object translation 1300B, in accordance with aspects of the present disclosure. After reception of an A2 measurement object, the A2 measurement object may be translated into WLAN concepts in a manner similar to that used to translate the A1 measurement object. At step 1302B, entering conditions for A2 reporting may be specified as a specific RSSI value, rssi_high, where rssi_high is equal to the A2 threshold 1302A minus the amount of hysteresis 1306A. A first WiFi A2 measurement request may be sent containing the entering conditions, an entering measurement ID (e.g., meas_id:21), along with a reporting type (e.g., Report_type) requesting periodic reports after the rssi_high threshold is met. The entering measurement ID may be specific to WLAN A2 entering conditions. Steps 1304B and 1306B operate similarly to those as described in conjunction with 1204B and 1206B in FIG. 12B.

At 1308B, leaving conditions for A2 reporting may be specified. The leaving conditions may be specified as a specific RSSI value, rssi_low, where rssi_low is equal to the A2 threshold 1302A plus the amount of hysteresis 1306A. A second WiFi A2 measurement request may be sent containing the leaving conditions, a leaving measurement ID (e.g., meas_id:22), along with a reporting type requesting a single report after the rssi_low threshold is met. The leaving measurement ID may be specific to WLAN A2 leaving conditions. Steps 1310B-1326B operate similarly to those described in conjunction with 1210B-1226B in FIG. 12B.

Figure 13C:
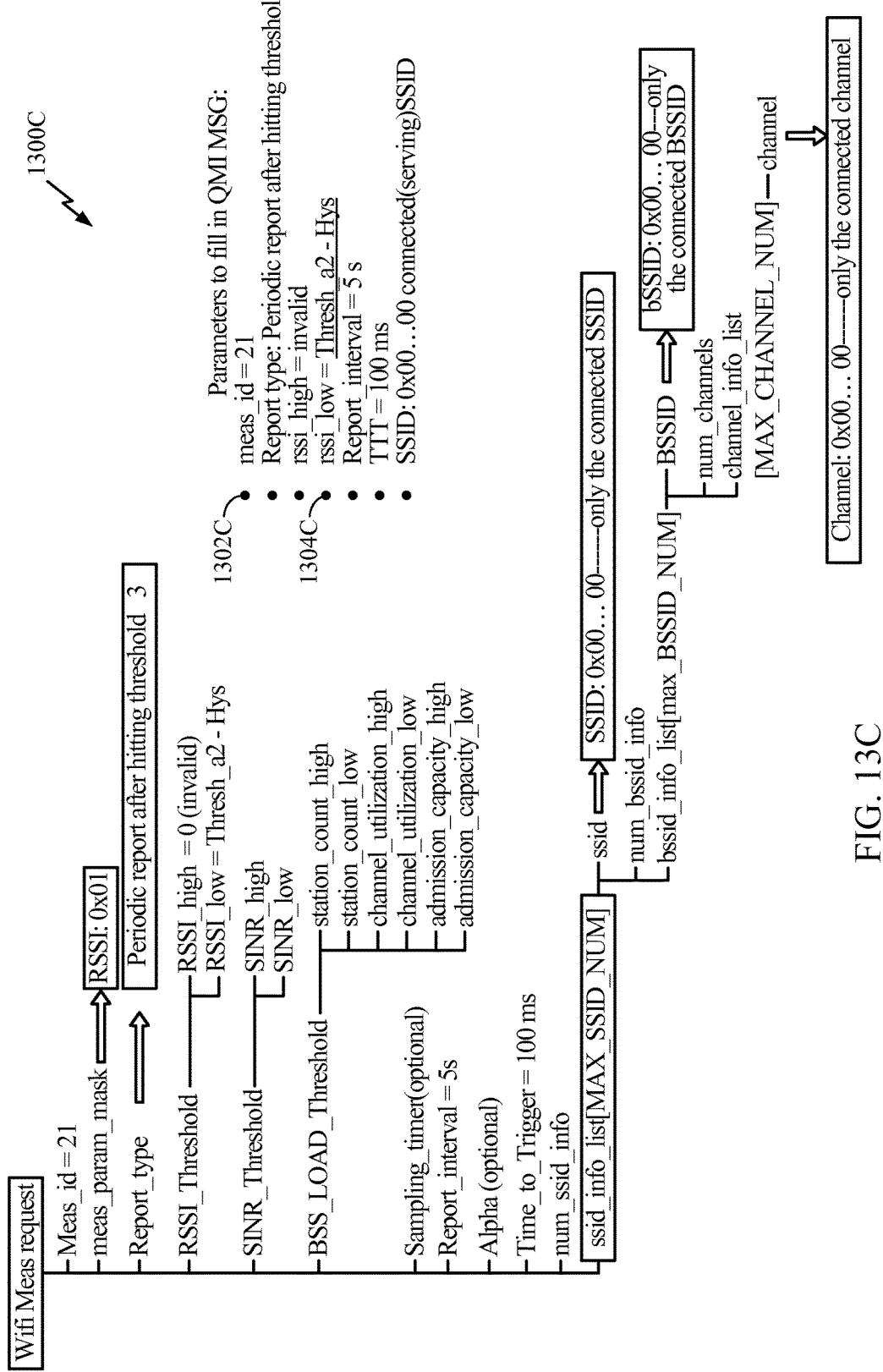

FIG. 13C illustrates an example WiFi A2 measurement request message 1300C, in accordance with certain aspects of the present disclosure. In certain aspects, the WiFi A2 measurement request message 1300C may correspond with the first WiFi A2 measurement request associated with entering conditions, as discussed in conjunction with 1302B in FIG. 13B. In certain aspects, the WiFi A2 measurement request message 1300C may be similar to the WiFi A1 measurement request message 1200C except that the WiFi A2 measurement request message 1300C may include a measurement ID parameter 1302C specific to WLAN A2 entering conditions, and a low threshold value 1304C is provided with a value equal to the A2 threshold 1302A minus the amount of hysteresis 1306A, as described in conjunction with 1302B of FIG. 13B.

Figure 13D:
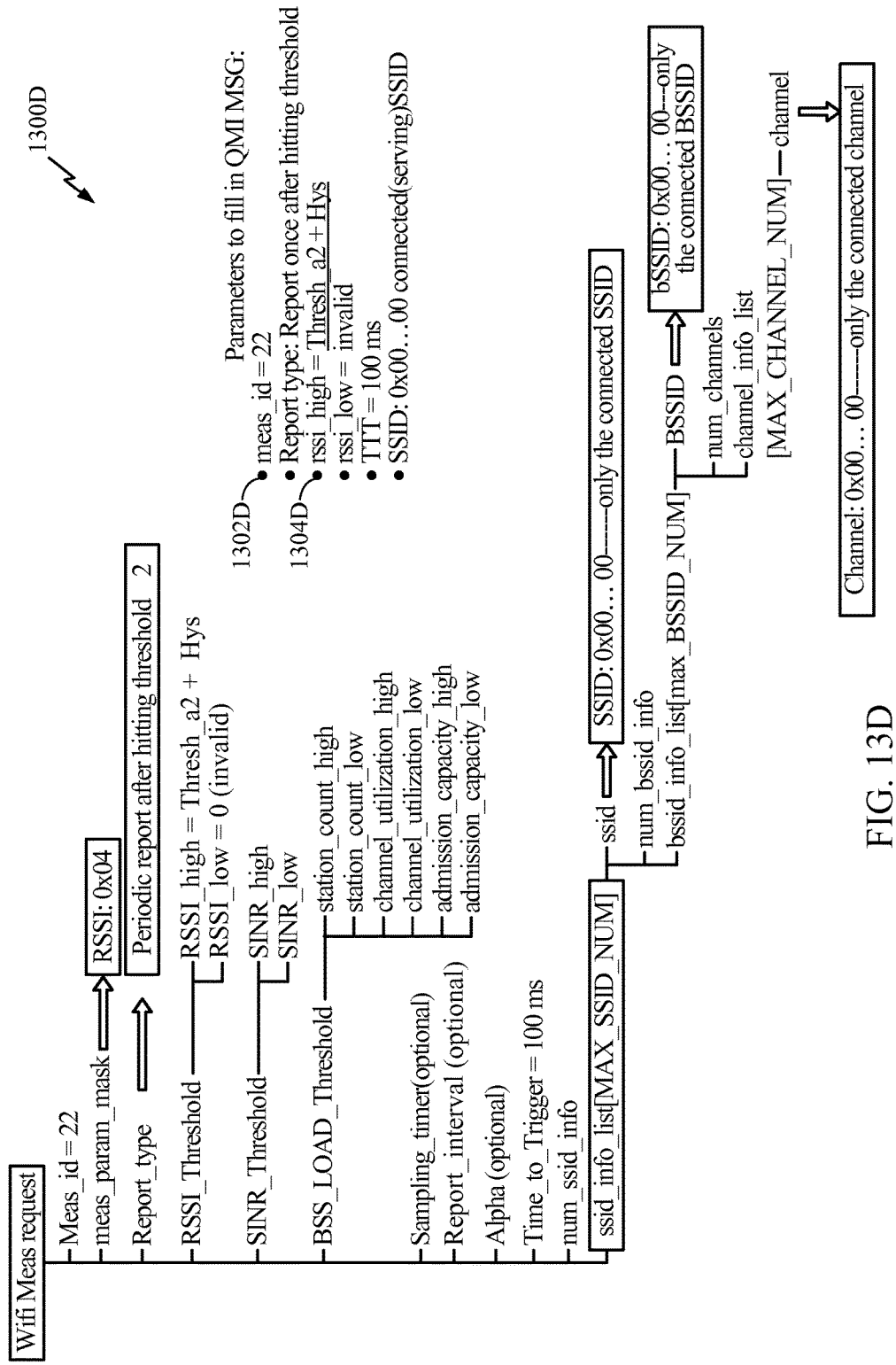

FIG. 13D illustrates an example WiFi A2 measurement request message 1300D, in accordance with certain aspects of the present disclosure. In certain aspects, the WiFi A2 measurement request message 1300D may correspond with the second WiFi A2 measurement request associated with leaving conditions, as discussed in conjunction with 1308B in FIG. 13B. In certain aspects, the WiFi A2 measurement request message 1300D may be similar to the WiFi A1 measurement request message 1200D except that the WiFi A2 measurement request message 1300D may include a measurement ID parameter 1302D specific to WLAN A2 leaving conditions, and a high threshold value 1304D is provided with a value equal to the A2 threshold 1302A plus the amount of hysteresis 1306A, as described in conjunction with 1308B of FIG. 13B.

Figure 13E:
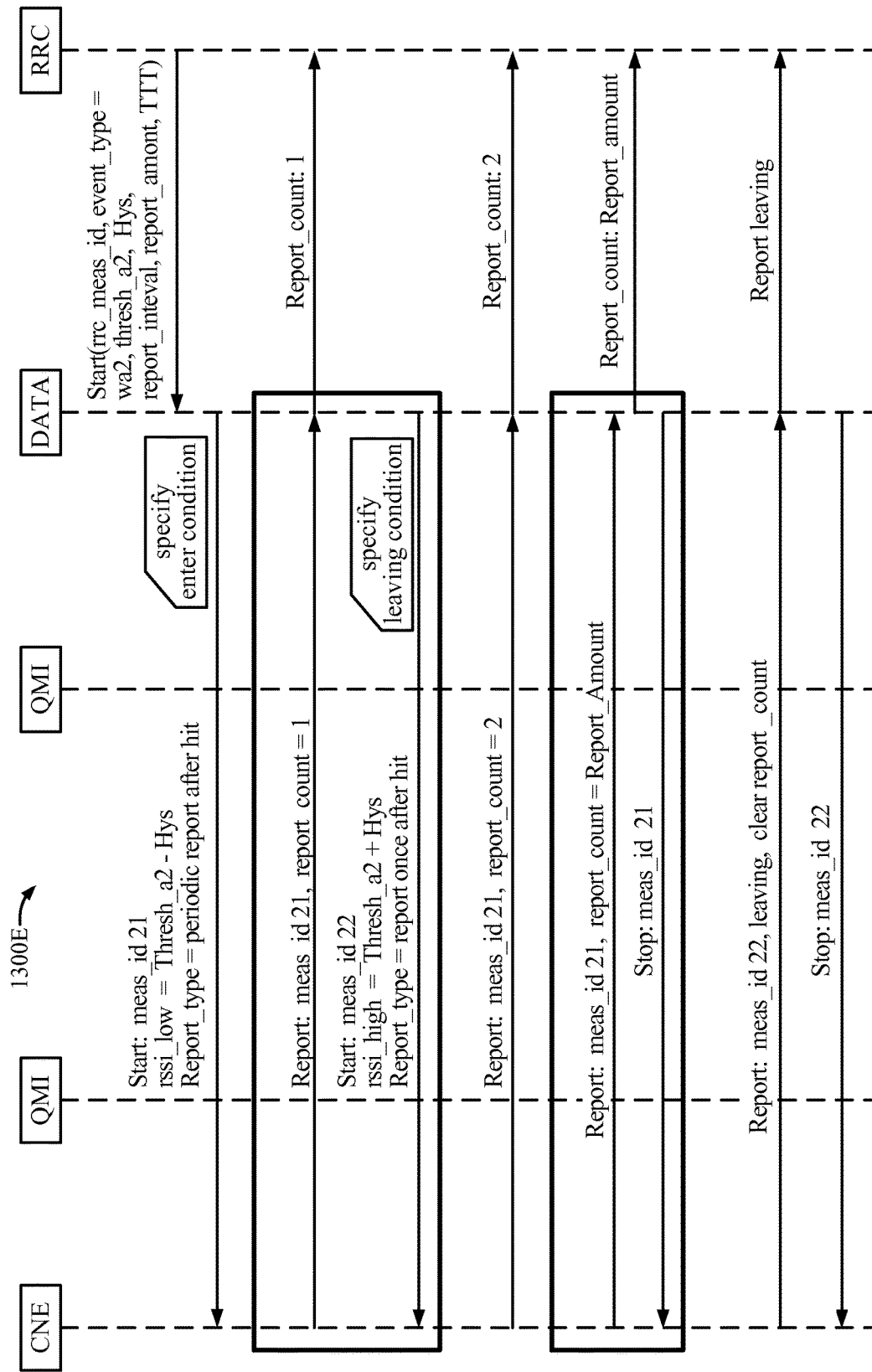

FIG. 13E illustrates an example WiFi A2 measurement call flow 1300E, in accordance with certain aspects of the present disclosure. In certain aspects, the WiFi A2 measurement call flow 1300E may be similar to the WiFi A1 measurement call flow 1200E except that WiFi A2 measurement IDs and threshold values are used, as described in conjunction with 1302B and 1308B of FIG. 13B.

Figure 14A:
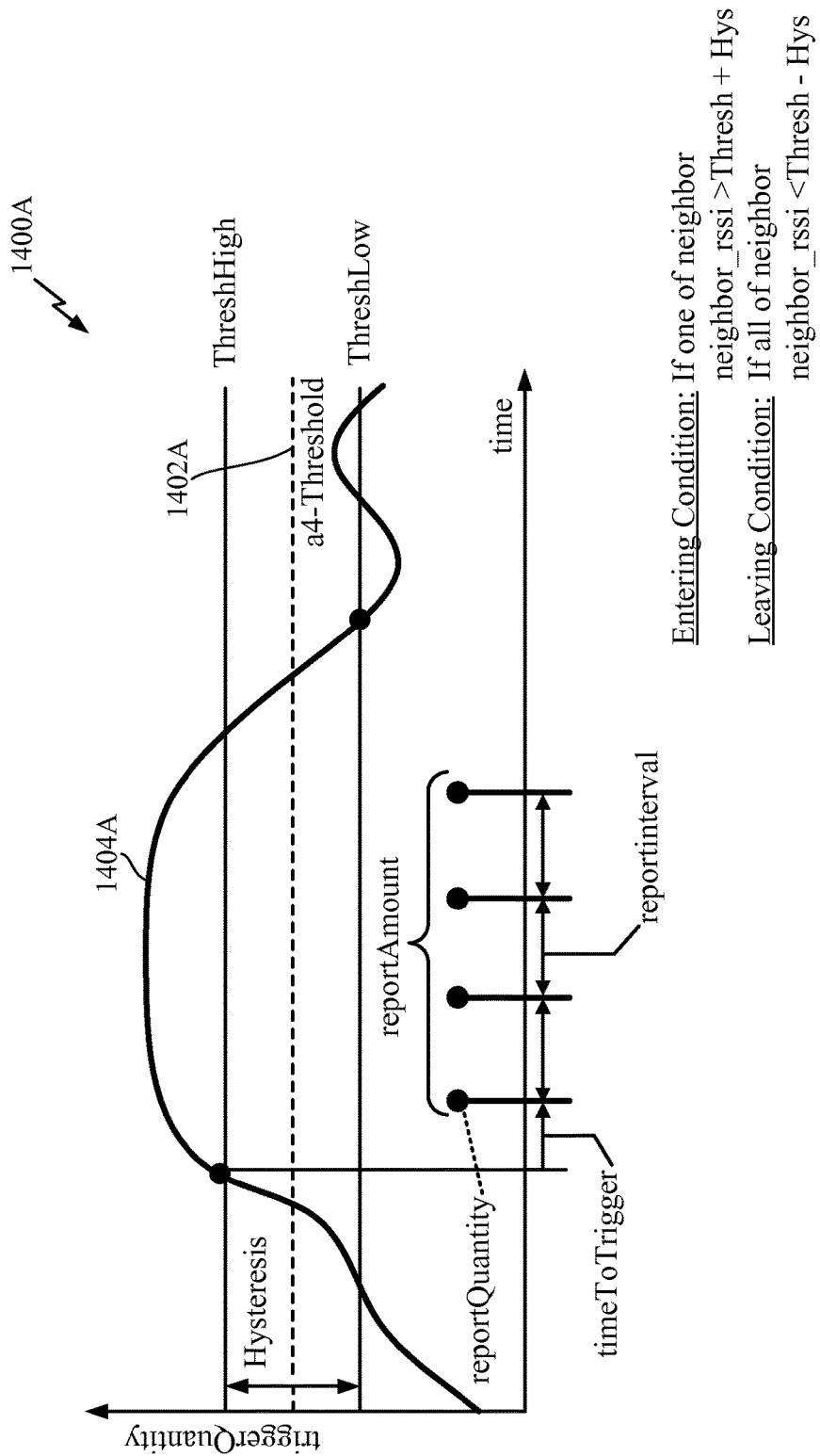

FIG. 14A illustrates a conceptual diagram of an A4 measurement object 1400A, in accordance with certain aspects of the present disclosure. The A4 event is similar to the A1 event as described in FIG. 12A except that the A4 event is triggered when a neighboring cell's signal quality 1404A becomes better than an A4 threshold 1402A level plus hysteresis. That is, the entry condition is, if one of the neighbor's RSSI value is higher than a certain threshold and the time to trigger passes, then the A4 situation is entered. Reporting is cancelled after the neighboring cell's signal quality 1404A drops below the A4 threshold minus the amount of hysteresis. Once information about a serving WLAN and/or neighboring cells are obtained, the information is composed together in a format compatible with WWAN technologies and the measurement report is sent over the WWAN network (i.e., the first RAT). The information contained inside the report may concern the WLAN RAT (i.e., the second RAT). The UE will send RSSI based meas reports for every 5 ms interval with reporting amount=4 after TTT=100 ms upon satisfying the entering condition until the leaving/exit condition in this example. When the leaving condition is met, the UE resets reportAmount to 0.

Figure 14B:
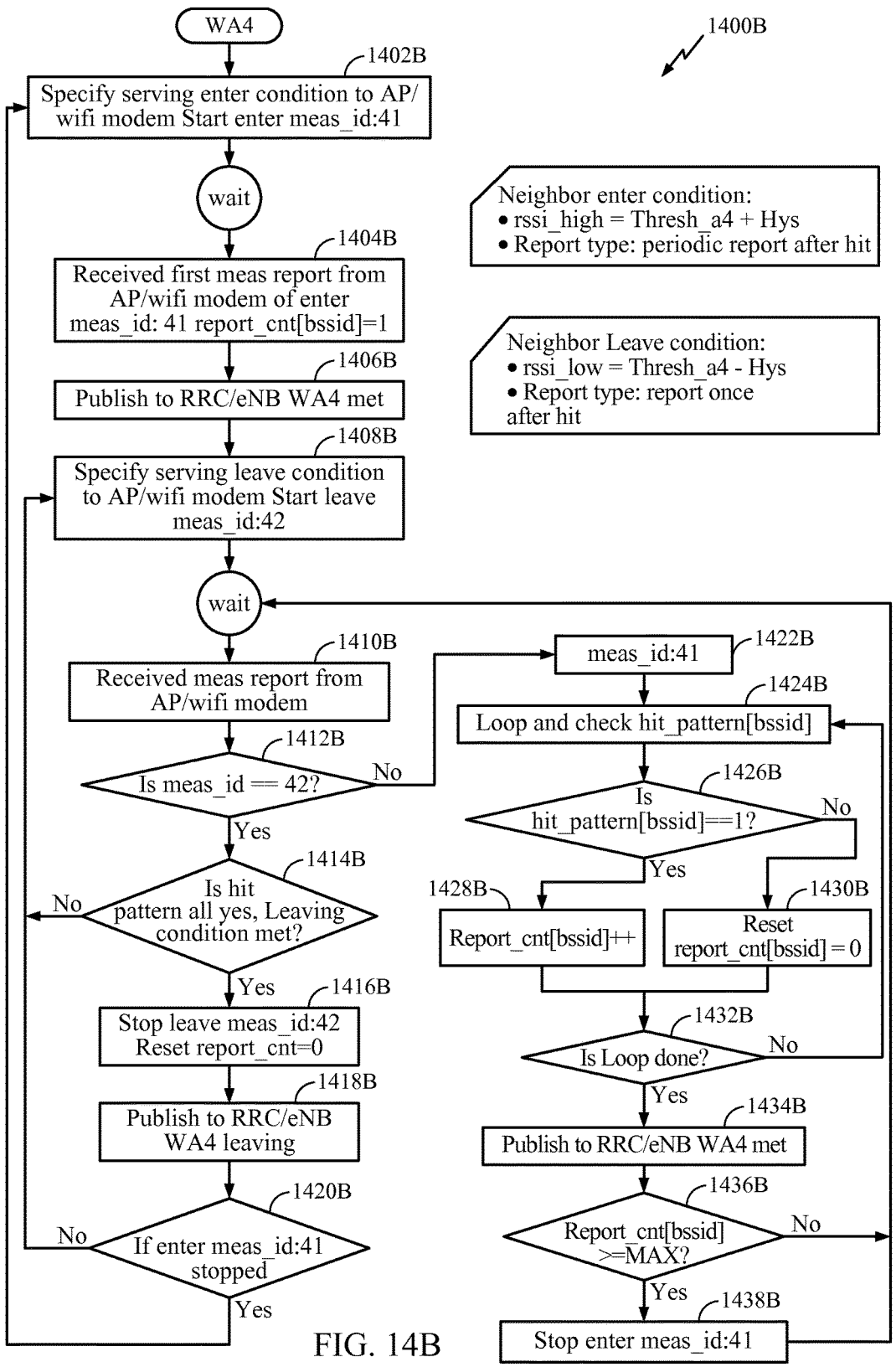

FIG. 14B illustrates an example flow diagram of an A4 measurement object translation 1400B, in accordance with aspects of the present disclosure. After reception of an A4 measurement object, the A4 measurement object may be translated into WLAN concepts in a manner similar to the A1 measurement object. At step 1402B, entering conditions for A4 reporting may be specified. The entering conditions may be specified as a specific RSSI value, rssi_high, where rssi_high is equal to the A4 threshold 1202A plus the amount of hysteresis. Where there are multiple neighboring WLANs, the entering conditions may be met if at least one of the multiple neighboring WLANs has a RSSI value above the rssi_high value. A first WiFi A4 measurement request may be sent, for example, to the applications processor or WiFi modem, containing the entering conditions, an entering measurement ID (e.g., meas_id:41), along with a reporting type (e.g., Report_type) requesting periodic reports after the rssi_high threshold is met. The entering measurement ID may be specific to WLAN A4 entering conditions.

At 1404B, after the entering conditions are met, the first report is received with a measurement ID matching the entering measurement ID of the first WiFi A4 measurement request and a report count of 1, indicating that the first report is the first measurement report after the entering conditions are met. The first report may also contain an indication of the SSID/BSSID of the neighboring WLAN. At 1406B, the first report is output to the cellular modem for transmission to the eNB.

At 1408B, leaving conditions for A4 reporting may be specified. The leaving conditions may be specified as a specific RSSI value, rssi_low, where rssi_low is equal to the A4 threshold 1402A minus the amount of hysteresis. A second WiFi A4 measurement request may be sent containing the leaving conditions, a leaving measurement ID (e.g., meas_id:42), along with a reporting type requesting a single report after the rssi_low threshold is met. Where there are multiple neighboring WLANs, the leaving conditions may be met if all of the multiple neighboring WLANs have an RSSI value falling below the rssi_low threshold. The leaving measurement ID may be specific to WLAN A4 leaving conditions. Steps 1410B-1412B operate similarly to those described in conjunction with 1210B-1212B in FIG. 12B.

If the check at 1412B indicates that the measurement ID matches that of the leaving measurement ID of the second WiFi A4 measurement request, then the leaving conditions have been met by for at least one SSID/BSSID of the multiple SSIDs/BSSIDs. At 1414B, the RSSI of each SSID/BSSID of the multiple SSIDs/BSSIDs is compared to the rssi_low threshold in order to determine if the leaving conditions have been met by all SSIDs/BSSIDs. If not all SSIDs/BSSIDs meet the leaving conditions, then execution loops to 1408B and leaving conditions for A4 reporting may be specified again. If all SSIDs/BSSIDs meet the leaving conditions, at step 1416B, a WiFi measurement stop message having a measurement ID matching the leaving measurement ID of the second WiFi A4 measurement request (meas_id: 42) may be sent. Steps 1418B and 1420B operate similarly to those described in conjunction with 1216B and 1218B, respectively, of FIG. 12B.

If the check at 1412B indicates that the measurement ID does not match that of the leaving measurement ID of the second WiFi A4 measurement request, execution proceeds to step 1422B, which checks to see if the measurement ID matches that of the entering measurement ID of the first WiFi A4 measurement request. Where there are multiple neighboring WLANs, the first report may include multiple SSIDs/BSSIDs within the report. Steps 1424B-1434B loops through the multiple SSIDs/BSSIDs. At 1426B the first report is checked to see if, for a SSID/BSSID of the multiple SSIDs/BSSID, there is an indication that the neighboring WLAN entering conditions has been met (e.g., if the RSSI is above the rssi_high threshold). If there is such an indication, then at 1428B, the report count associated with the SSID/BSSID is incremented. If there is no such indication, then the report count associated with the SSID/BSSID is reset at 1430B. At 1432B, a check is performed to see if all of the multiple SSIDs/BSSIDs have been evaluated.

At 1434B, the first report is output to the cellular modem for transmission to the eNB. At 1436B, the report count may be checked against the specified maximum number of reports for the multiple SSIDs/BSSIDs. If the report count is less than the maximum number of reports, execution proceeds to wait for the next measurement report. At step 1438B, if the report count associated with at least one SSID/BSSID of the multiple SSIDs/BSSIDs is greater than or equal to the specified maximum number of reports, then a WiFi measurement stop message having a measurement ID matching the entering measurement ID of the first WiFi A4 measurement request (meas_id: 41) may be sent. Execution then proceeds to wait for the next measurement report.

Figure 14C:
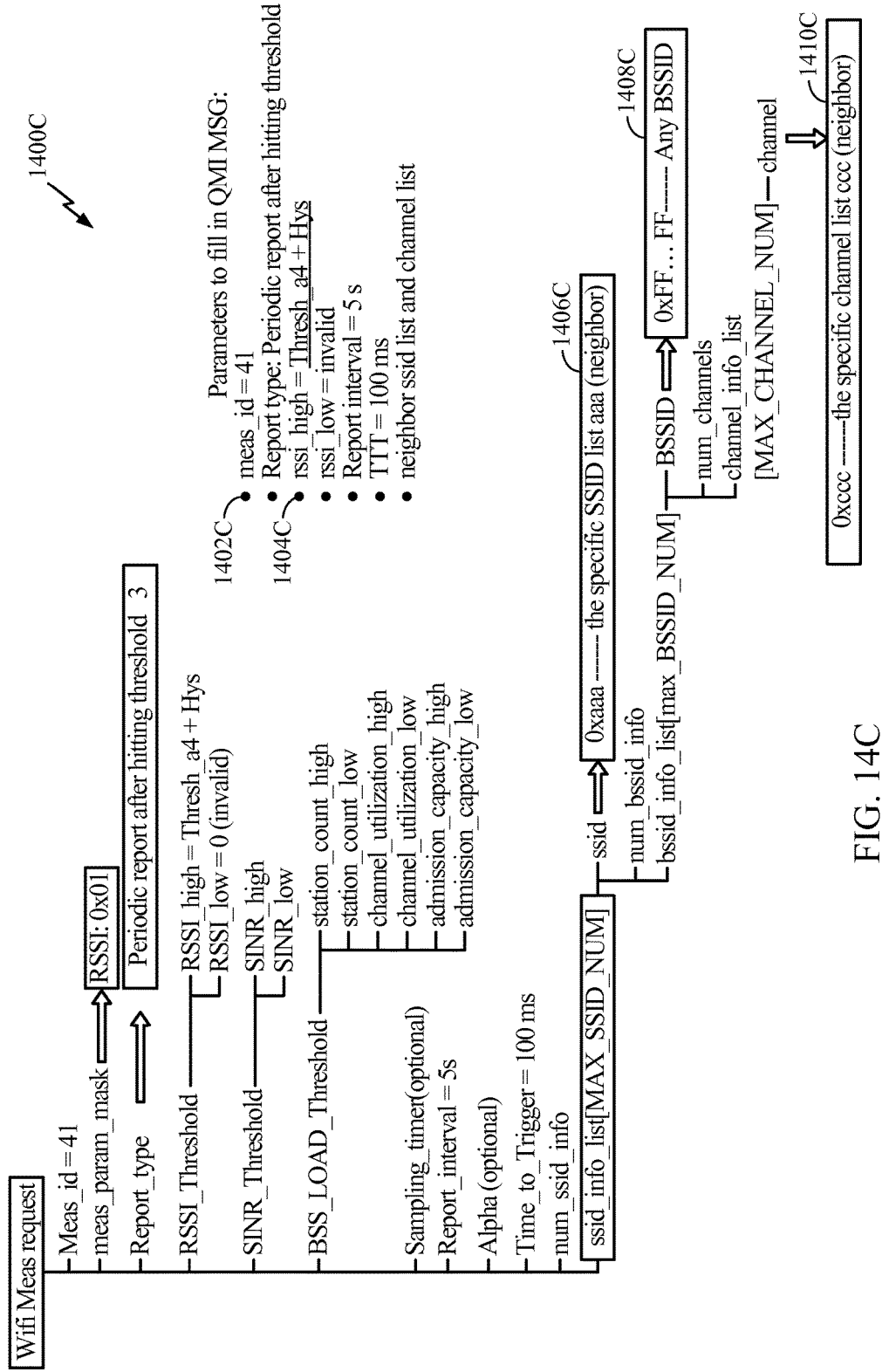

FIG. 14C illustrates an example WiFi A4 measurement request message 1400C, in accordance with certain aspects of the present disclosure. In certain aspects, the WiFi A4 measurement request message 1400C may correspond with the first WiFi A4 measurement request associated with entering conditions, as discussed in conjunction with 1402B in FIG. 14B. In certain aspects, the WiFi A4 measurement request message 1400C may be similar to the WiFi A1 measurement request message 1200C except that the WiFi A4 measurement request message 1400C may include a measurement ID parameter 1402C specific to WLAN A4 entering conditions, and a high threshold value 1404C is provided with a value equal to the A4 threshold 1402A plus the amount of hysteresis, as described in conjunction with 1402B of FIG. 14B. Additionally, the SSID information parameter 1406C may be provided with SSIDs of neighbor WLANs based on a neighbor WLAN list. The BSSID information parameter 1408C may request reporting on any BSSID. The channel information parameter 1410C may be provided with a specific list of the channels for the neighboring WLANs.

Figure 14D:
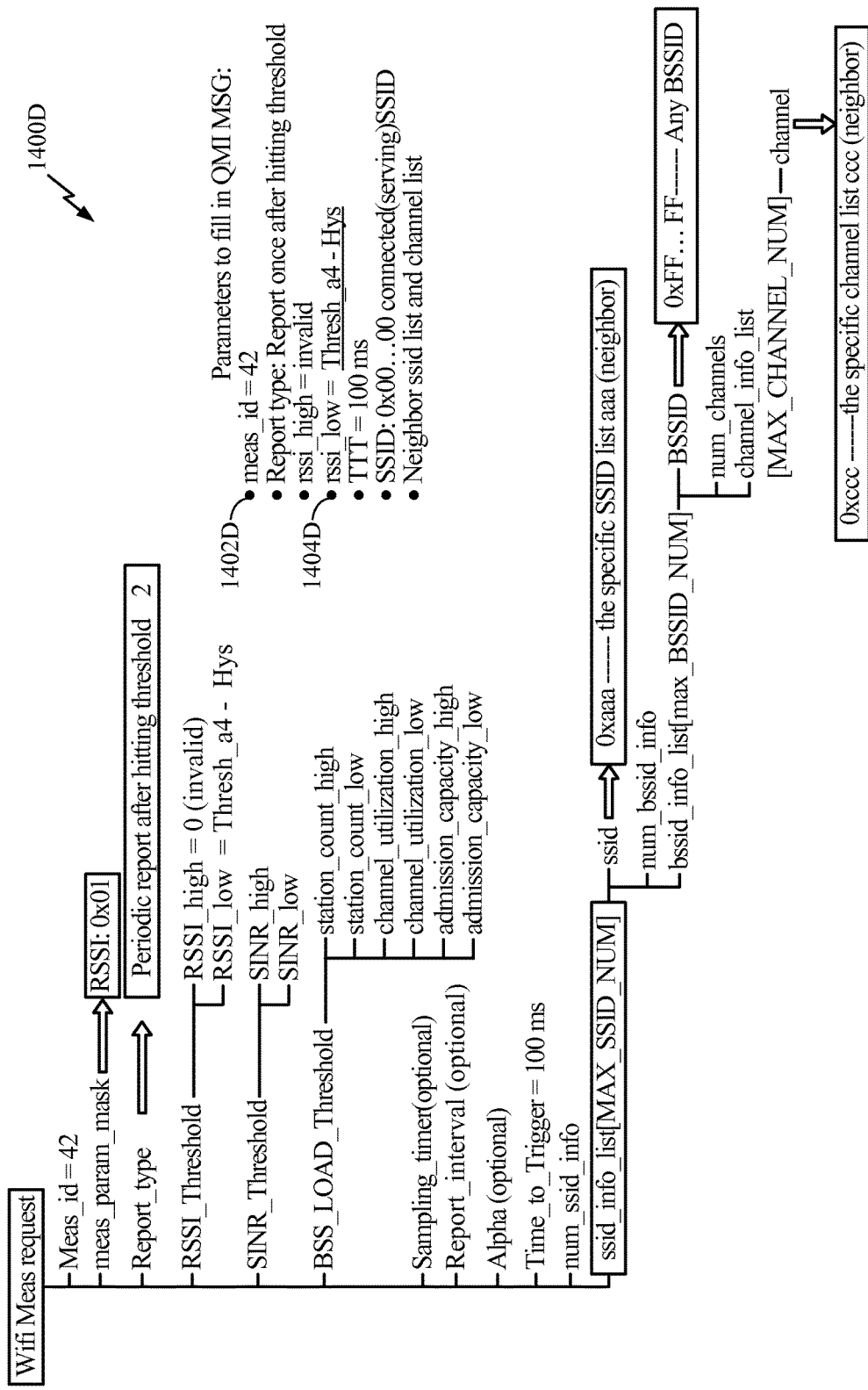

FIG. 14D illustrates an example WiFi A4 measurement request message 1400D, in accordance with certain aspects of the present disclosure. In certain aspects, the WiFi A4 measurement request message 1400D may correspond with the second WiFi A4 measurement request associated with leaving conditions, as discussed in conjunction with 1408B in FIG. 14B. In certain aspects, the WiFi A4 measurement request message 1400D may be similar to the WiFi A1 measurement request message 1200D except that the WiFi A4 measurement request message 1400D may include a measurement ID parameter 1402D specific to WLAN A4 leaving conditions, and a low threshold value 1404D is provided with a value equal to the A4 threshold 1402A minus the amount of hysteresis, as described in conjunction with 1408B of FIG. 14B. SSID, BSSID, and channel information parameters may be similar to those described in conjunction with 1406C, 1408C, and 1410C of FIG. 14C.

Figure 14E:
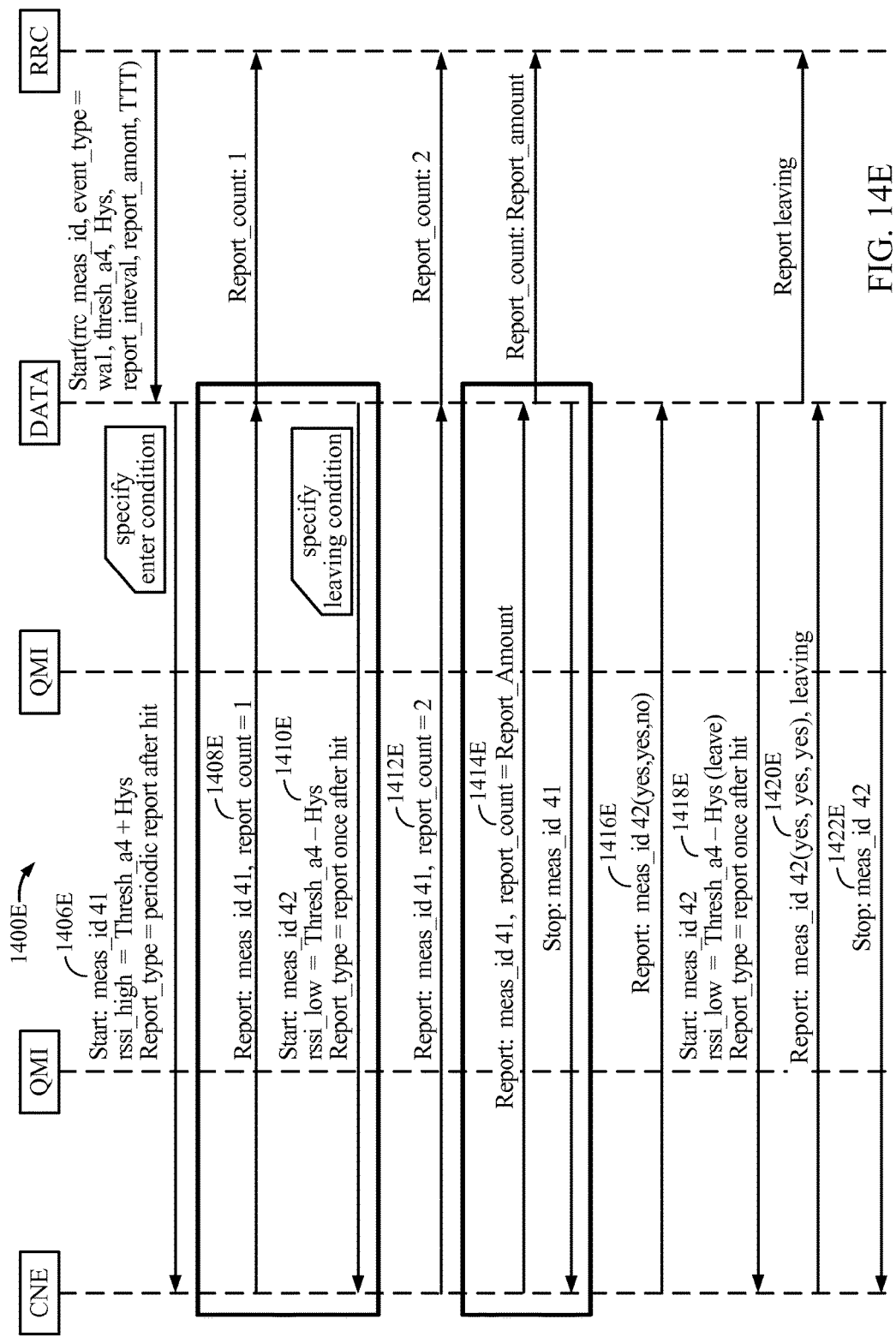

FIG. 14E illustrates an example WiFi A4 measurement call flow 1400E, in accordance with certain aspects of the present disclosure. In certain aspects, steps 1406E-1414E may be similar to those described in conjunction with 1206E-1214E of FIG. 12E. At 1416E, a fourth report may be received having a measurement ID matching the leaving measurement ID of the second WiFi A4 measurement request, as discussed in conjunction with 1414B of FIG. 14B. This fourth report may also indicate that not all of the SSIDs/BSSIDs have met the leaving conditions. At 1418E, a third WiFi A4 measurement request with leaving conditions may be sent, as discussed in conjunction with 1414B and 1408B of FIG. 14B. At 1420E, a fifth report may be received having a measurement ID matching the leaving measurement ID of the third WiFi A4 measurement request. This fifth report may indicate that all of the SSIDs/BSSIDs have met the leaving conditions, as discussed in conjunction with 1416B of FIG. 14B, and may be outputted. At 1422E, a WiFi measurement stop message with a measurement ID matching the leaving measurement ID of the third WiFI A4 measurement request may be sent.

Figure 15A:
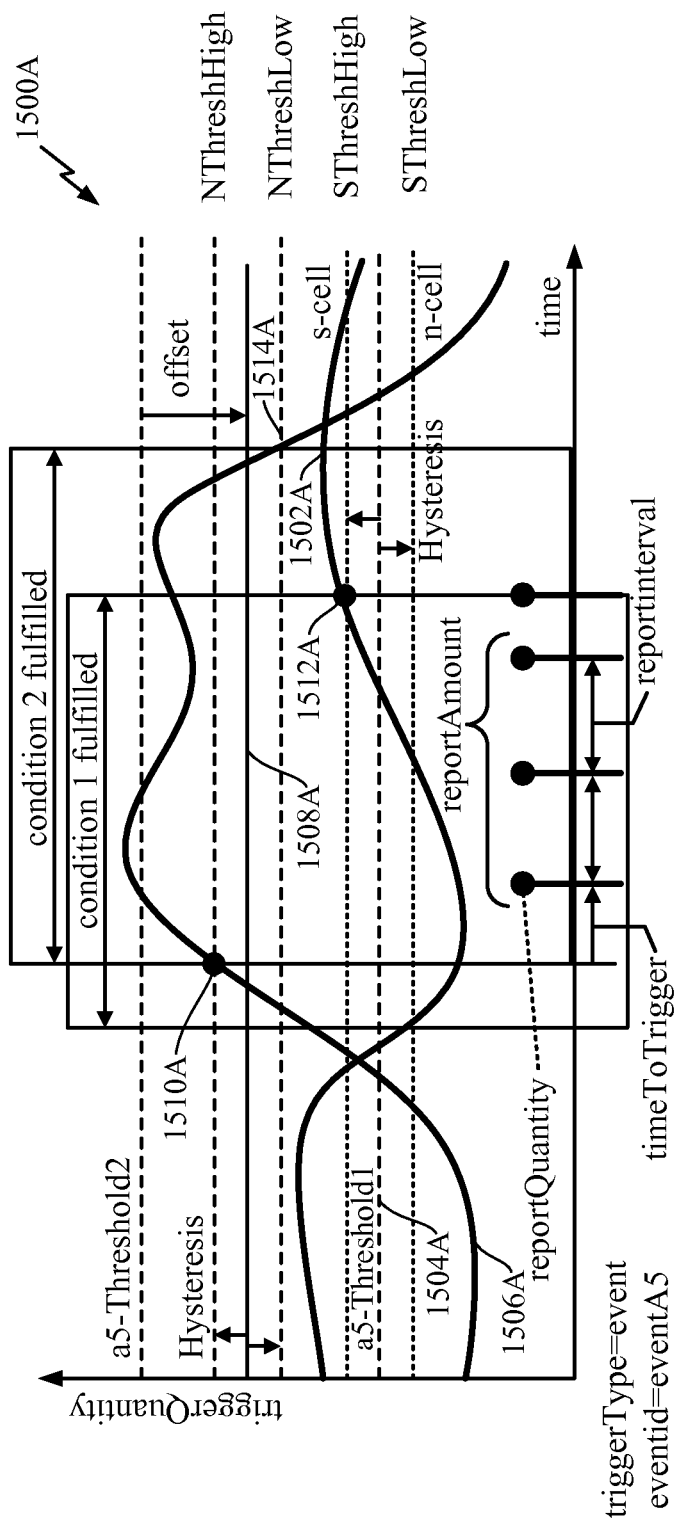

FIG. 15A illustrates a conceptual diagram of an A5 measurement object 1500A, in accordance with certain aspects of the present disclosure. The A5 event is triggered 1510A when both the serving WLAN signal quality 1502A becomes worse than a first A5 threshold 1504A minus hysteresis and a neighboring WLAN signal quality 1506A becomes better than a second A5 threshold 1508A plus hysteresis. Reporting is cancelled after either the serving WLAN signal quality 1502A becomes better than the first A5 threshold 1504A plus hysteresis at 1512A or the neighboring WLAN signal quality 1506A drops below the second A5 threshold minus the amount of hysteresis at 1514A. As with the A1 measurement object 1200A, a total number of reports, reporting interval, and time to trigger may also be set.

Figure 15B:
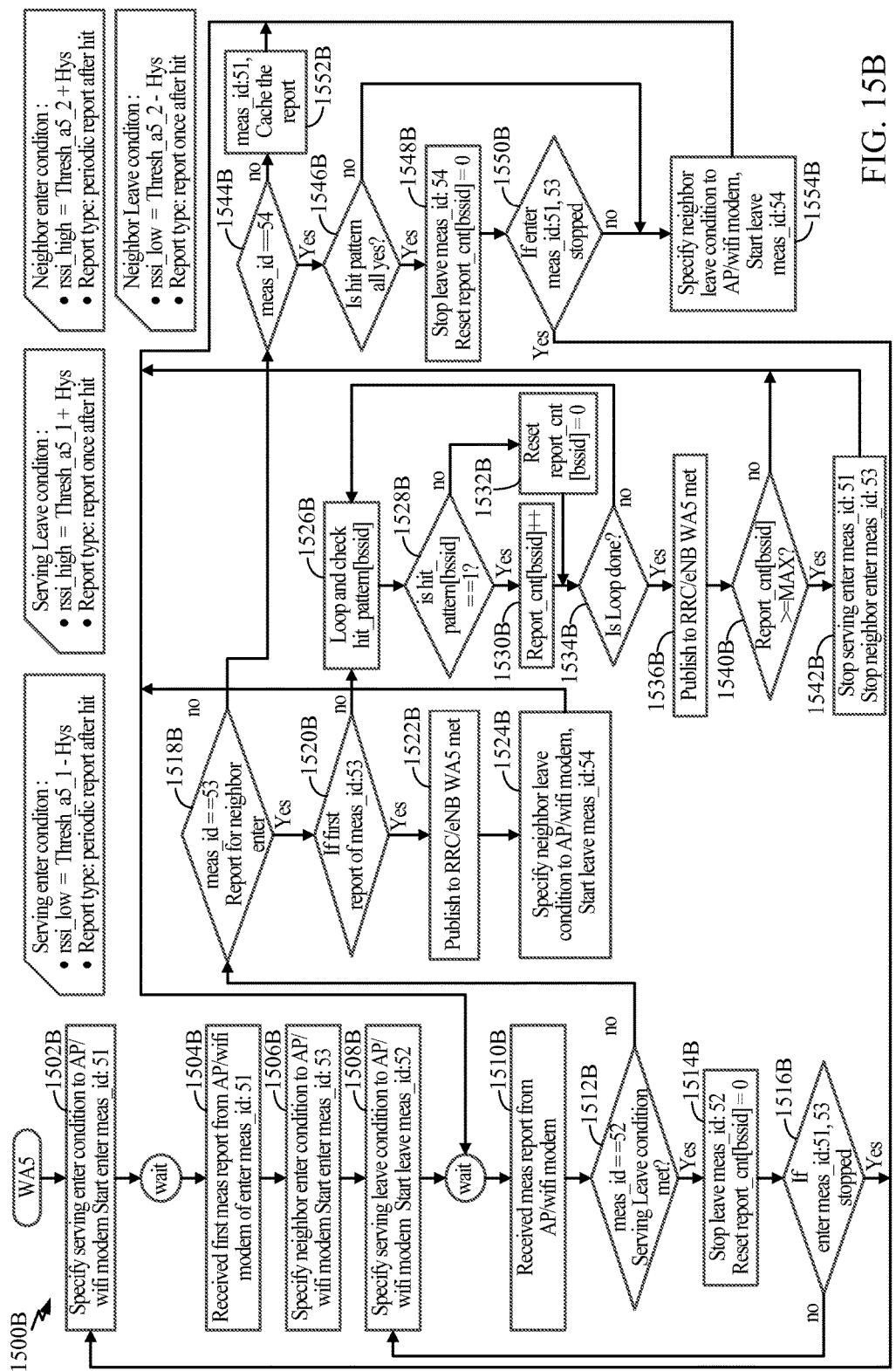

FIG. 15B illustrates an example flow diagram of an A5 measurement object translation 1500B, in accordance with aspects of the present disclosure. After reception of an A5 measurement object, the A5 measurement object may be translated into WLAN concepts. At step 1502B, entering conditions for A5 reporting for a serving WLAN may be specified. Serving WLAN entering conditions may be specified as a specific RSSI value, rssi_low, where rssi_low is equal to the first threshold 1504A minus the amount of hysteresis. A first serving WiFi A1 measurement request may be sent, for example, to the applications processor or WiFi modem, containing the serving WLAN entering conditions, a serving WLAN entering measurement ID (e.g., meas_id:51), along with a reporting type (e.g., Report_type) requesting periodic reports after the rssi_high threshold is met. The serving WLAN entering measurement ID may be specific to A5 serving WLAN entering conditions.

At 1504B, after the serving WLAN entering conditions are met, a first report is received with a measurement ID matching the serving WLAN entering measurement ID. At 1506B, entering conditions for A5 reporting for a neighboring WLAN may be specified. Neighboring WLAN entering conditions may be specified as a specific RSSI value, rssi_high, where rssi_high is equal to the second threshold 1508A plus the amount of hysteresis. A first neighboring WiFi A5 measurement request may be sent, for example, to the applications processor or WiFi modem, containing the neighboring WLAN entering conditions, a neighboring WLAN entering measurement ID (e.g., meas_id:53), along with a reporting type (e.g., Report_type) requesting periodic reports after the rssi_high threshold is met. The neighboring WLAN entering measurement ID may be specific to A5 neighboring WLAN entering conditions.

At 1508B leaving conditions for A5 reporting for a serving WLAN may be specified. Serving WLAN leaving conditions may be specified as a specific RSSI level, rssi_high, where rssi_high is equal to the first threshold 1504A plus the amount of hysteresis. A second serving WiFi A5 measurement request may be sent containing the serving WLAN leaving conditions, a serving WLAN leaving measurement ID (e.g., meas_id:52), along with a reporting type requesting a single report after the rssi_high threshold is met. The serving WLAN leaving measurement ID may be specific to A5 serving WLAN leaving conditions.

After the receipt of a next report at 1510B, the measurement ID of the next report is check against the serving WLAN leaving measurement ID and the neighboring WLAN entering measurement ID for a match at 1512B.

If the measurement ID of the next report matches the serving WLAN leaving measurement ID, execution proceeds to 1514B and a serving WiFi measurement stop message having a measurement ID matching the serving WLAN leaving measurement ID of the second serving WiFi A5 measurement request may be sent. The report count for the associated BSSID may also be reset to zero.

At 1516B, a check is performed to determine if the reporting associated with the serving WLAN entering conditions and the neighboring WLAN entering conditions have been stopped, for example, if a specified maximum number of reports have been reached. If both reporting have been stopped, then execution returns to the entering state. If either of the entering conditions reporting have not been stopped, then execution loops to 1508B and leaving conditions for A5 reporting for a serving WLAN may be specified again.

If, at 1512B, the measurement ID of the next report does not match the serving WLAN leaving measurement ID, execution proceeds to 1518B, where the measurement ID of the next report is checked against the neighboring WLAN entering measurement ID. If there is a match at 1520B and this is the first time a neighboring WLAN measurement report has been received, the neighboring WLAN measurement report is output for transmission to the eNB at step 1522B.

At 1524B leaving conditions for A5 reporting for the neighboring WLAN may be specified. Neighboring WLAN leaving conditions may be specified as a specific RSSI level, rssi_low, where rssi_low is equal to the second threshold 1508A minus the amount of hysteresis. A second neighboring WiFi A5 measurement request may be sent containing the neighboring WLAN leaving conditions, a neighboring WLAN leaving measurement ID (e.g., meas_id:54), along with a reporting type requesting a single report after the rssi_low threshold is met. The neighboring WLAN leaving measurement ID may be specific to A5 neighboring WLAN leaving conditions. Execution then waits to receive another measurement report.

Where there are multiple neighboring WLANs, measurement reports may include multiple SSIDs/BSSIDs. If there is a match at 1520B and this is not the first time a neighboring WLAN measurement report has been received, execution proceeds to 1526B-1534B and loops through the multiple SSIDs/BSSIDs. At 1528B the first report is checked to see if, for a SSID/BSSID of the multiple SSIDs/BSSID, there is an indication that the neighboring WLAN entering conditions has been met for the neighboring WLAN (e.g., if the RSSI is above the rssi_high threshold). If there is such an indication, then at 1530B, the report count associated with the SSID/BSSID is incremented. If there is no such indication, then the report count associated with the SSID/BSSID is reset at 1532B. At 1534B, a check is performed to see if all of the multiple SSSIDs/BSSIDs have been evaluated. If not all of the multiple SSSIDs/BSSIDs have been evaluated, then the loop continues, otherwise at 1536B, the first report is output for transmission to the eNB.

At 1540B, the report count may be checked against the specified maximum number of reports for the multiple SSIDs/BSSIDs. If the report count is less than the maximum number of reports, execution proceeds to wait for the next measurement report. At step 1542B, if the report count associated with at least one SSID/BSSID of the multiple SSIDs/BSSIDs is greater than or equal to the specified maximum number of reports, then a first WiFi measurement stop message having a measurement ID matching the entering measurement ID of the first serving WiFi A5 measurement request (meas_id: 51) and a second WiFi measurement stop message having a measurement ID matching the first neighboring WiFi A5 measurement request (meas_id: 53) may be sent. Execution then proceeds to wait for the next measurement report.

Returning to 1512B, if the measurement ID of the next report does not match the serving WLAN leaving measurement ID or the neighboring WLAN entering measurement ID, execution proceeds to 1544B, where the measurement ID of the next report is checked against the neighboring WLAN leaving measurement ID. If there is a match, at 1546B a check is made to see if the serving WLAN leaving conditions have also been met and if met, and if so, a neighboring WiFi measurement stop message having a measurement ID matching the neighboring WLAN leaving measurement ID may be sent and the report count associated with SSID/BSSID may be reset at 1548B. If, at 1546B, the serving WLAN leaving conditions have not been met, then the leaving conditions for A5 reporting for the neighboring WLAN may be specified again at 1554B and execution then waits to receive another measurement report. At 1550B, if the reporting associated with the serving WLAN entering conditions and the neighboring WLAN entering conditions have been stopped, then execution returns to the entering state. If either reporting has not been stopped, then execution proceeds to 1554B, as described above.

Returning to 1544B, if the measurement ID of the next report matches the serving WLAN entering measurement ID at 1552B, then the next report is cached and execution proceeds to wait for the next measurement report.

Figure 15C:
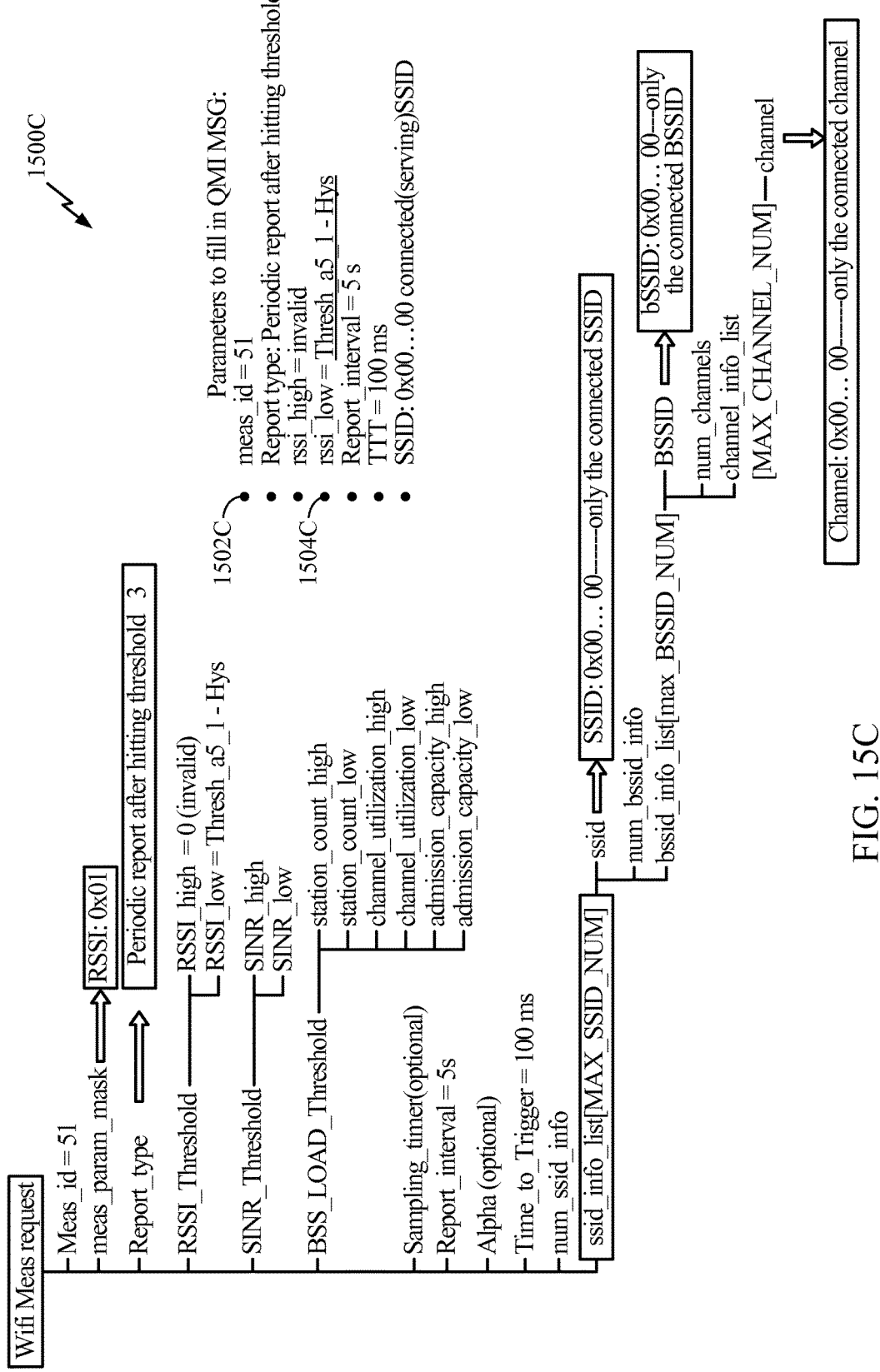

FIG. 15C illustrates an example WiFi A5 measurement request message 1500C, in accordance with certain aspects of the present disclosure. In certain aspects, the WiFi A5 measurement request message 1500C may correspond with first serving WiFi A1 measurement request associated with entering conditions, as discussed in conjunction with 1502B in FIG. 15B. In certain aspects, the first serving WiFi A1 measurement request may be similar to the WiFi A1 measurement request message 1200C except that the first serving WiFi A5 measurement request message may include a measurement ID parameter 1502C specific to the A5 serving WLAN entering measurement ID, and a low threshold value 1504C is provided with a value equal to the first A5 threshold 1504A minus the amount of hysteresis, as described in conjunction with 1502B of FIG. 15B.

Figure 15D:
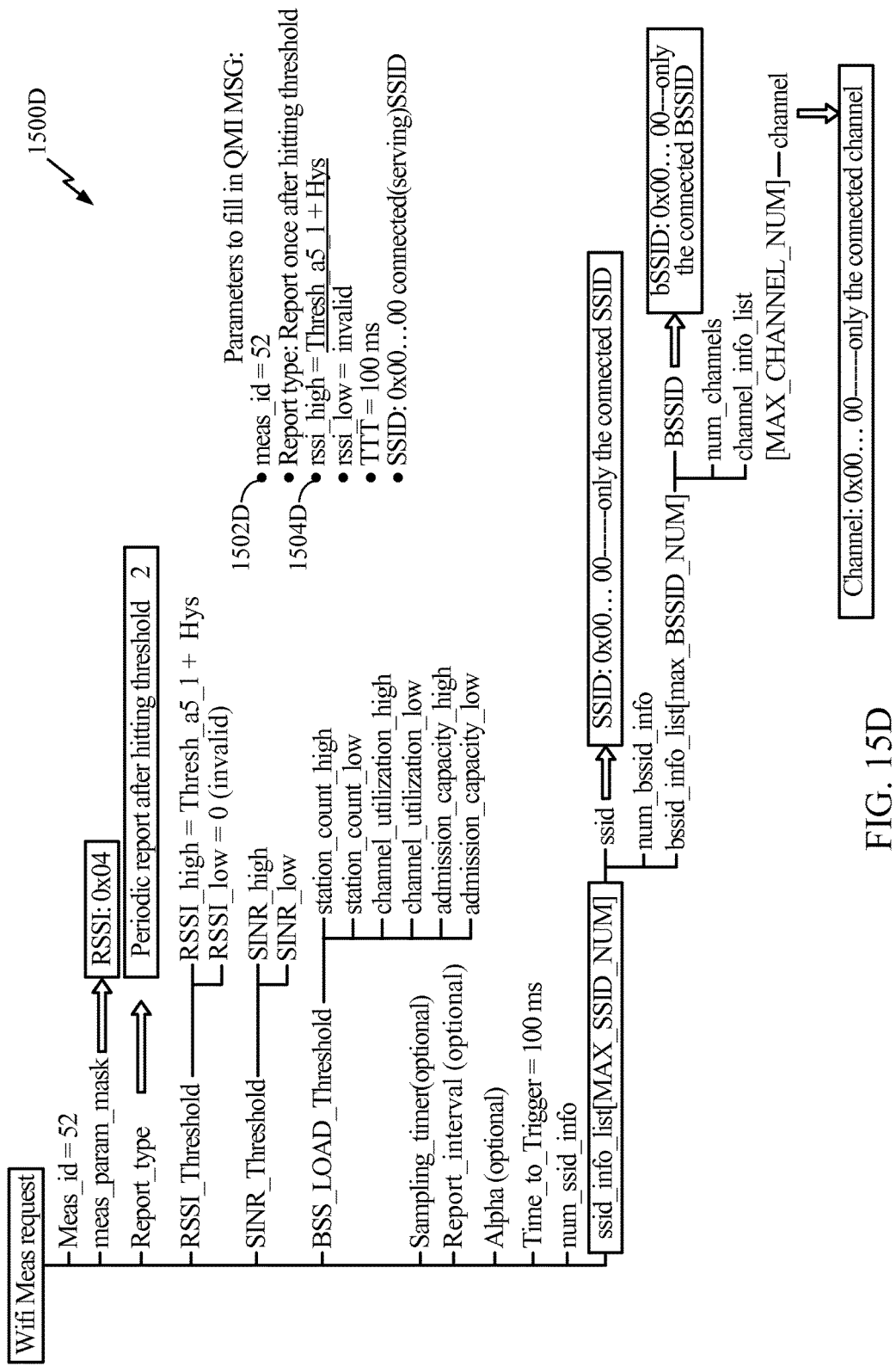

FIG. 15D illustrates an example WiFi A5 measurement request message 1500D, in accordance with certain aspects of the present disclosure. In certain aspects, the WiFi A5 measurement request message 1500D may correspond with the second serving WiFi A5 measurement request associated with leaving conditions, as discussed in conjunction with 1508B in FIG. 15B. In certain aspects, the second serving WiFi A5 measurement request may be similar to the WiFi A1 measurement request message 1200D except that the second serving WiFi A5 measurement request message may include a measurement ID parameter 1502D specific to the A5 serving WLAN leaving measurement ID, and a high threshold value 1504D is provided with a value equal to the first A5 threshold 1504A plus the amount of hysteresis, as described in conjunction with 1508B of FIG. 15B.

Figure 15E:
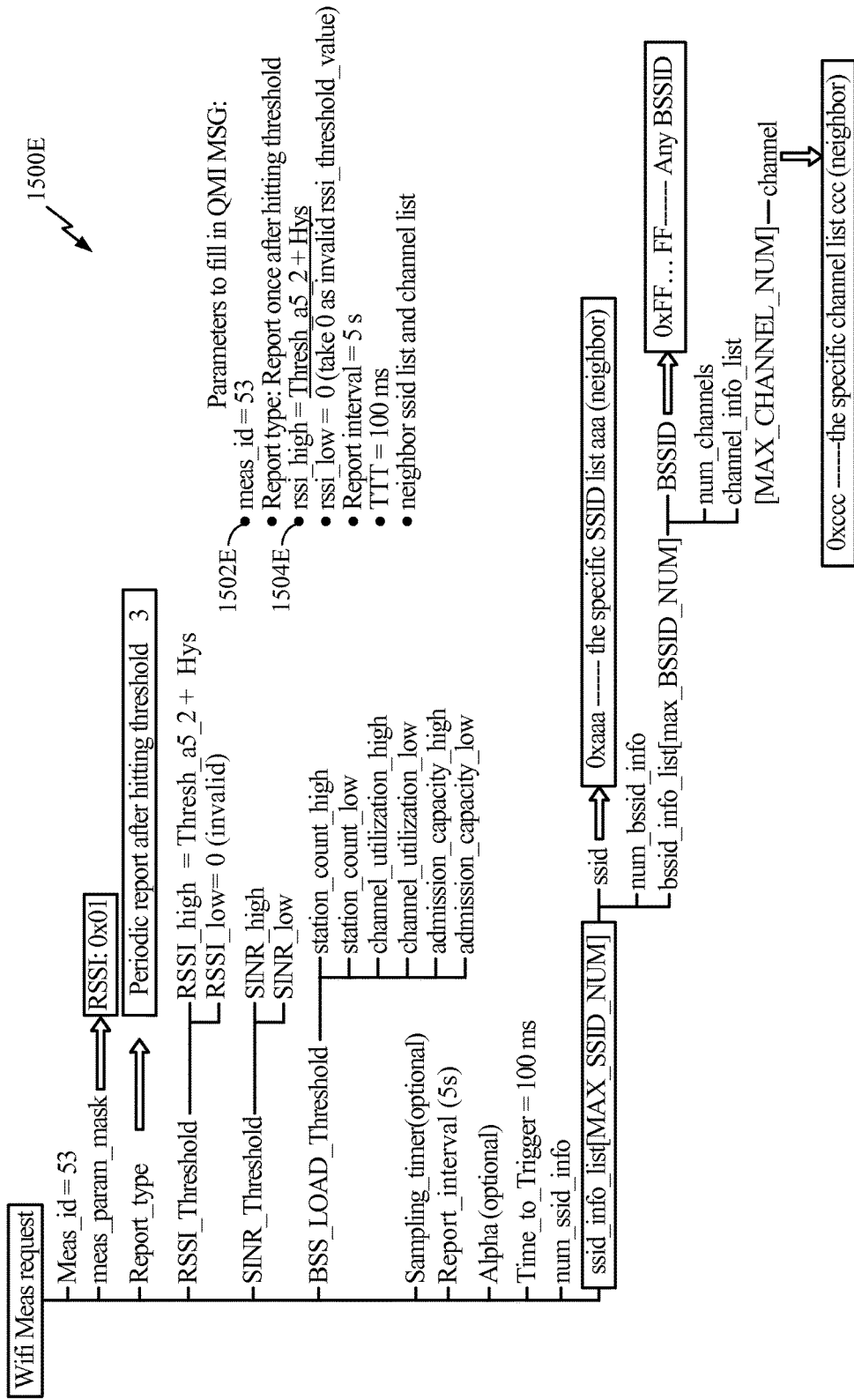

FIG. 15E illustrates an example WiFi A5 measurement request message 1500E, in accordance with certain aspects of the present disclosure. In certain aspects, the WiFi A5 measurement request message 1500E may correspond with the first neighboring WiFi A5 measurement request associated with entering conditions, as discussed in conjunction with 1506B in FIG. 15B. In certain aspects, the first neighboring WiFi A5 measurement request may be similar to the WiFi A4 measurement request message 1400C except that the first neighboring WiFi A5 measurement request message may include a measurement ID parameter 1502E specific to the A5 neighboring WLAN entering measurement ID, and a high threshold value 1504E is provided with a value equal to the second A5 threshold 1508A plus the amount of hysteresis, as described in conjunction with 1506B of FIG. 15B. SSID, BSSID, and channel information parameters may be similar to those described in conjunction with 1406C, 1408C, and 1410C of FIG. 14C.

Figure 15F:
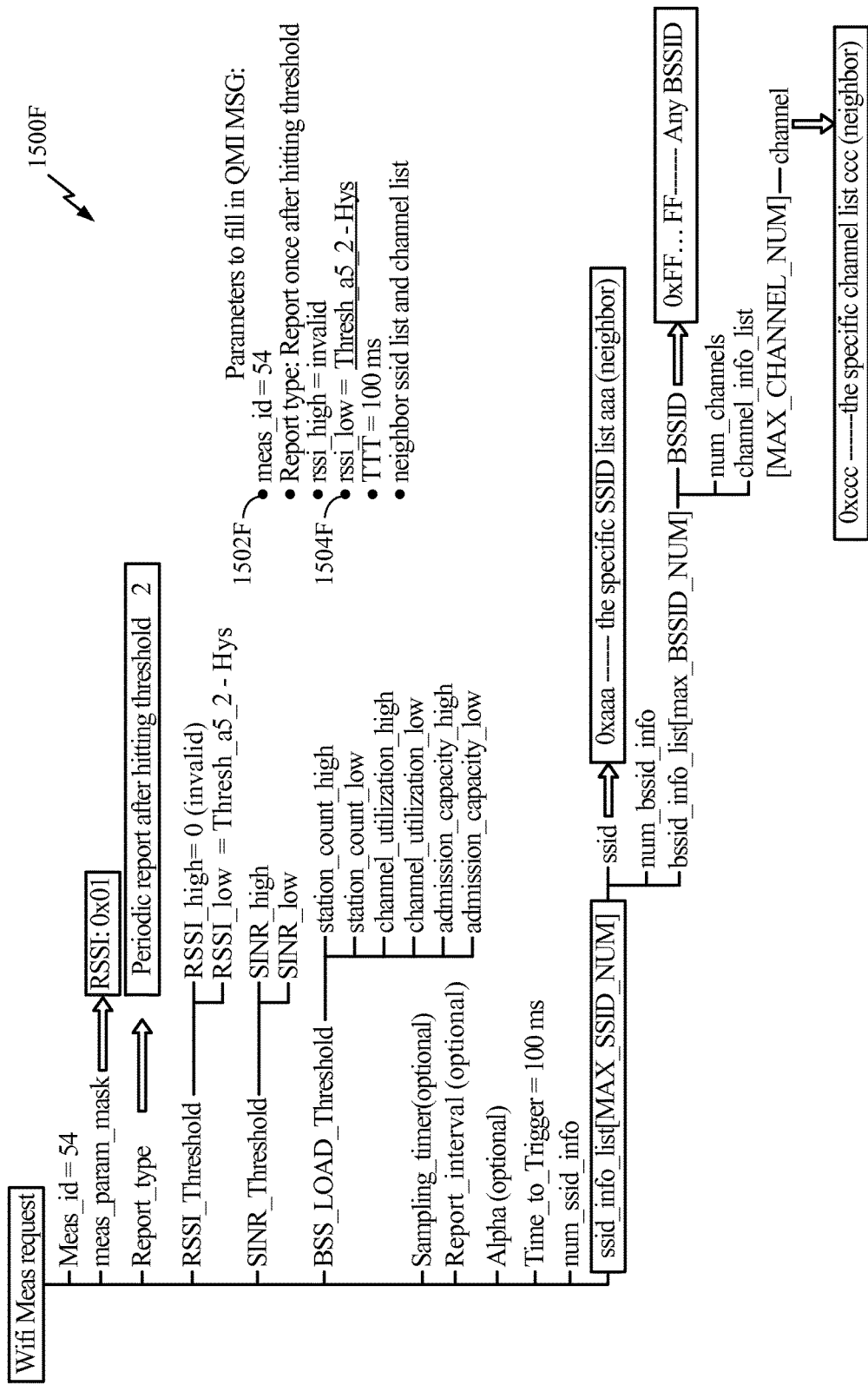

FIG. 15F illustrates an example WiFi A5 measurement request message 1500F, in accordance with certain aspects of the present disclosure. In certain aspects, the WiFi A5 measurement request message 1500F may correspond with the second neighboring WiFi A5 measurement request associated with leaving conditions, as discussed in conjunction with 1524B in FIG. 15B. In certain aspects, the second neighboring WiFi A5 measurement request may be similar to the WiFi A4 measurement request message 1400D except that the second neighboring WiFi A5 measurement request message may include a measurement ID parameter 1502F specific to the A5 neighboring WLAN leaving measurement ID, and a low threshold value 1504F is provided with a value equal to the second A5 threshold 1508A minus the amount of hysteresis, as described in conjunction with 1506B of FIG. 15B. SSID, BSSID, and channel information parameters may be similar to those described in conjunction with 1406C, 1408C, and 1410C of FIG. 14C.

Figure 15G:
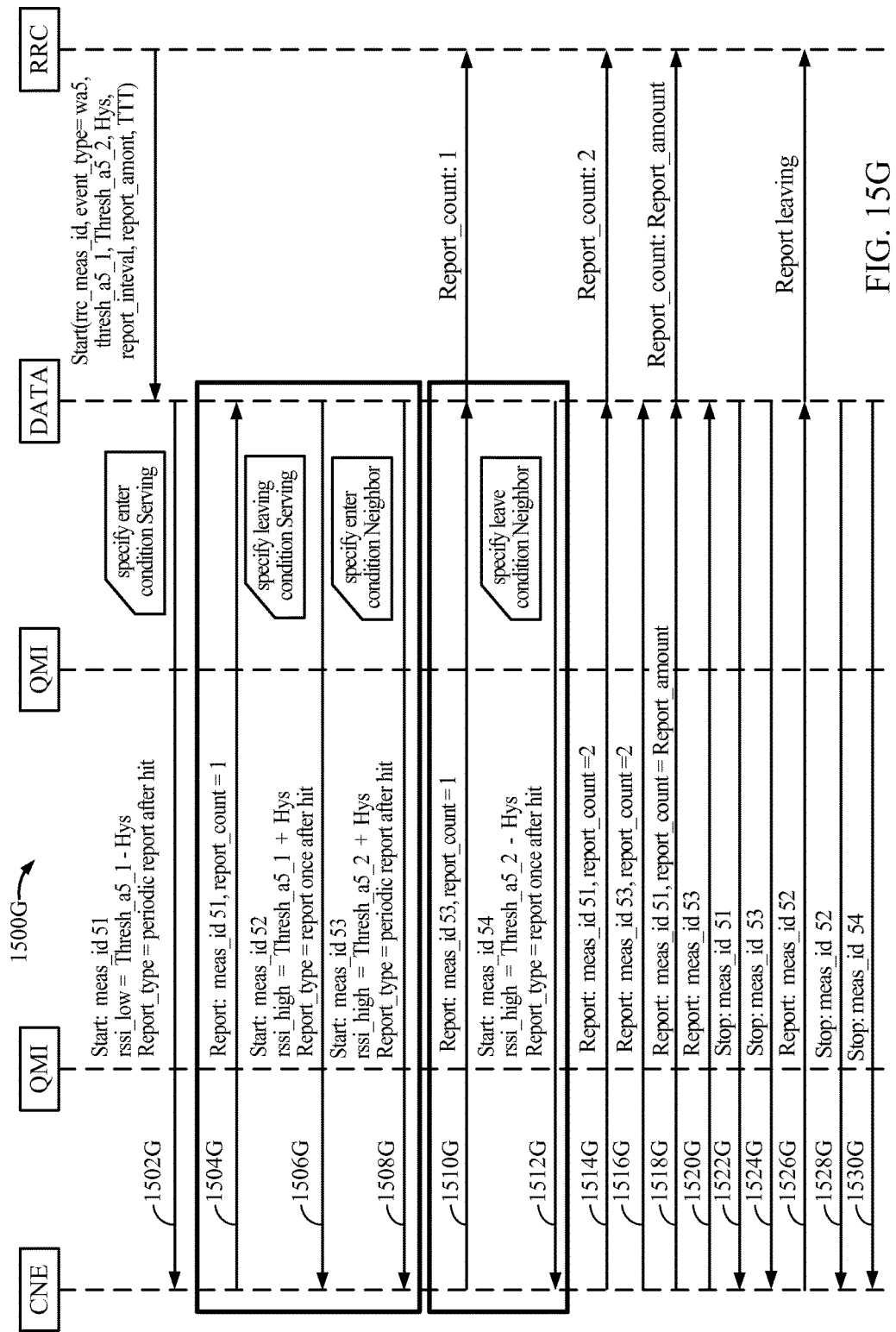

FIG. 15G illustrates an example WiFi A5 measurement call flow 1500G, in accordance with certain aspects of the present disclosure. In certain aspects, steps 1502G-1506G may be similar to those described in conjunction with 1206E-1210E of FIG. 12E. At 1508G, the first neighboring WiFi A5 measurement request may be sent to the connectivity engine (CNE), as discussed in conjunction with 1506B of FIG. 15B. At 1510G, a second report with a measurement ID matching the neighboring WLAN entering measurement ID is received, as discussed in conjunction with 1518B of FIG. 15B. The second report may be output for transmission and the report count incremented. At 1512G, the second neighboring WiFi A5 measurement request may be sent to the CNE, as discussed in conjunction with 1524B of FIG. 15B.

At 1514G, a third report with a measurement ID matching the serving WLAN entering measurement ID is received, as discussed in conjunction with 1552B of FIG. 15B. The third report may be output for transmission and the report count incremented. At 1516G, a fourth report with a measurement ID matching the neighboring WLAN entering measurement ID is received, as discussed in conjunction with 1518B of FIG. 15B. As the fourth report is not the first time a report has been received with a measurement ID matching the neighboring WLAN entering measurement ID, loop 1526B-1534B of FIG. 15B may be executed.

At 1518G, a fifth report with a measurement ID matching the serving WLAN entering measurement ID is received, as discussed in conjunction with 1552B of FIG. 15B. The report count is incremented based on the fifth report resulting in a report count equal to or greater than the maximum number of reports. The fifth report may be output for transmission with an indication that the maximum number of reports has been reached. At 1520G, a sixth report with a measurement ID matching the neighboring WLAN entering measurement ID is received and as the maximum number of reports has been reached, as discussed in conjunction with 1540B and 1542B, WiFi measurement stop messages are sent to the CNE. At 1522G a first WiFi measurement stop message having a measurement ID matching the entering measurement ID of the first serving WiFi A5 measurement request and at 1524G, a second WiFi measurement stop message having a measurement ID matching the first neighboring WiFi A5 measurement request may be sent to the CNE.

At 1526G, a seventh report with a measurement ID matching the serving WLAN leaving measurement ID is received, as discussed in conjunction with 1512B of FIG. 15B, and an indication that the A5 event is ending is output for transmission. At 1528G, a serving WiFi measurement stop message having a measurement ID matching the serving WLAN leaving measurement ID of the second serving WiFi A5 measurement request may be sent. At 1530G, a neighboring WiFi measurement stop message having a measurement ID matching the neighboring WLAN leaving measurement ID of the second neighboring WiFi A5 measurement request may be sent.

Figure 15H:
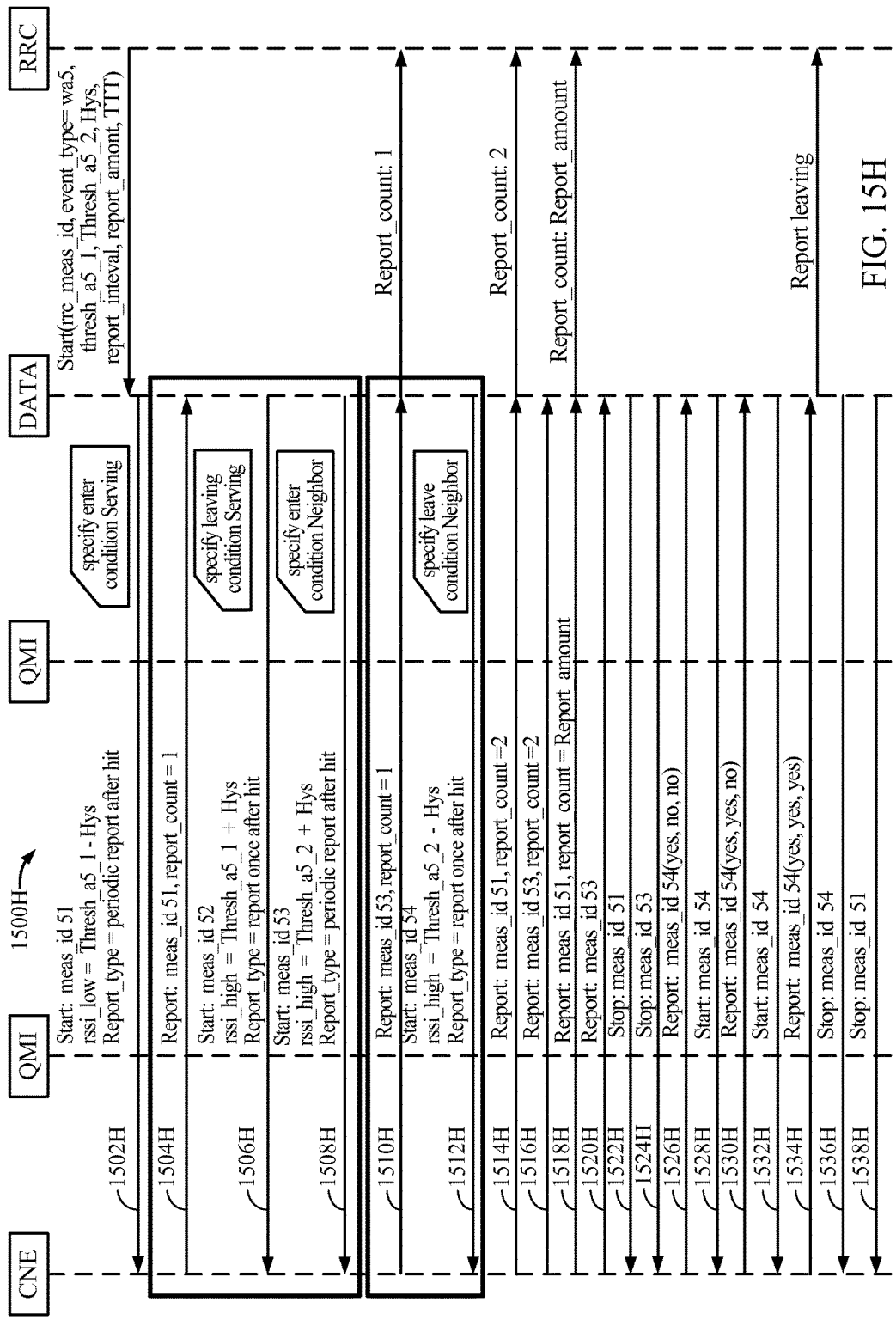

FIG. 15H illustrates an example WiFi A5 measurement call flow 1500H, in accordance with certain aspects of the present disclosure. In certain aspects, steps 1502H-1524H may be similar to those described in conjunction with 1502G-1524G of FIG. 15G. At 1526H, a seventh report with a measurement ID matching the neighboring WLAN leaving measurement ID is received, as discussed in conjunction with 1544B. As discussed in conjunction with 1546B of FIG. 15B, the seventh report indicates that not all of the leaving conditions for each SSID/BSSID have been met, and at 1528H, the leaving conditions for A5 reporting for the neighboring WLAN may be specified again, as discussed in conjunction with 1554B of FIG. 15B. 1530H-1532H are similar to steps 1526H-1528H. At step 1534H, a ninth report with a measurement ID matching the neighboring WLAN leaving measurement ID is received. In this case, the ninth report indicates that all of the leaving conditions for each SSID/BSSID have been met, as discussed in conjunction with 1548H of FIG. 15H, and an indication that the A5 event is ending is output for transmission.

At 1536H, a neighboring WiFi measurement stop message having a measurement ID matching the neighboring WLAN leaving measurement ID of the second neighboring WiFi A5 measurement request may be sent. At 1538H, a serving WiFi measurement stop message having a measurement ID matching the serving WLAN entering measurement ID of the first serving WiFi A5 measurement request may be sent.

Figure 16:
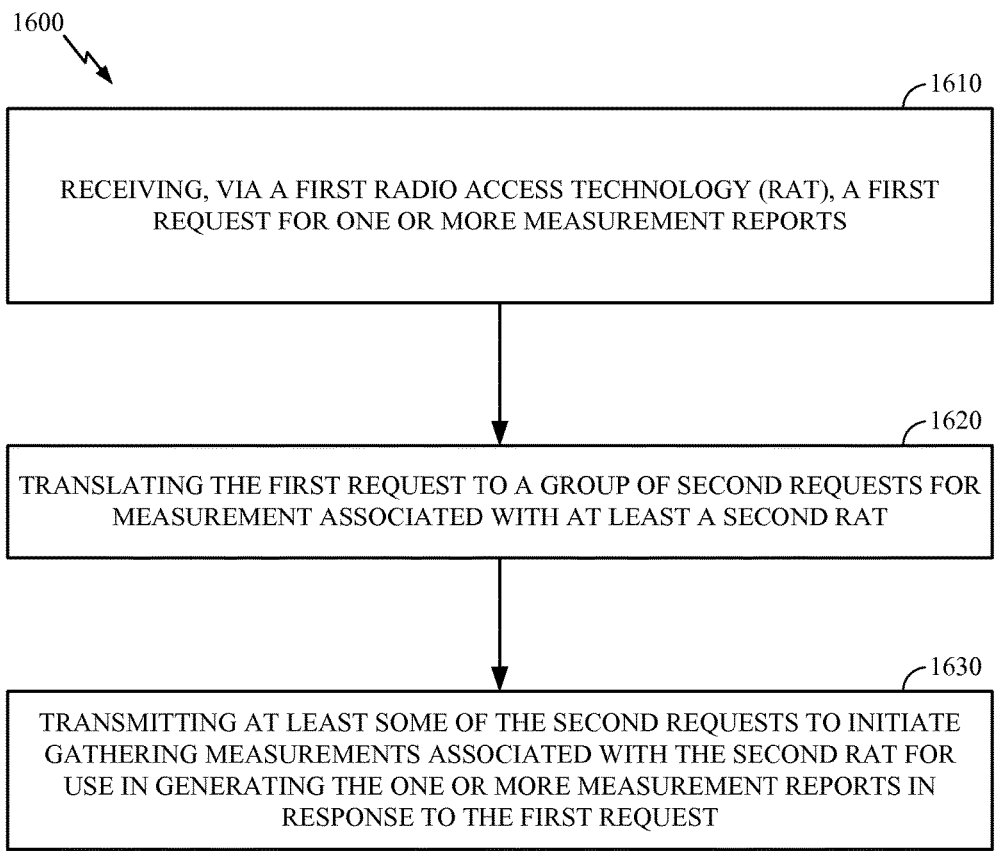
FIG. 16 illustrates a method for measurement reporting, according to certain aspects of the present disclosure.

FIG. 16 illustrates a method 1600 for measurement reporting, according to certain aspects of the present disclosure. As shown, the method includes, at block 1610, receiving, via a first radio access technology (RAT), a first request for one or more measurement reports. At block 1620, translating the first request to a group of second requests for measurement associated with at least a second RAT. At block 1630, transmitting at least some of the second requests to initiate gathering measurements associated with the second RAT for use in generating the one or more measurement reports in response to the first request.

Throughout the present disclosure, many aspects are discussed in terms of specific radio access networks RANs, such as LTE and Wi-Fi, for purposes of clarity. However, the disclosure is not so limited and may apply to aggregation using any suitable combination of RANs. Thus, the term BS may refer to any variety of radio node that serves other devices (e.g., that serves UEs, access terminals, or stations) and may include BSs of long range RANs (e.g., E-UTRAN, eNodeBs, or UTRAN BSs) or short range RANs (e.g., WiFi/WLAN APs, femto/pico/micro eNodeBs).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for receiving and means for transmitting may be a transceiver 222 and/or an antenna(s) 224 of the eNB 210 illustrated in FIG. 2 or the transceiver 254 and/or antenna(s) 252 of UE 250 illustrated in FIG. 2. Means for determining, means for performing, means for giving, means for translating, means for ignoring, means for discovering, and means for reporting may comprise a processing system, which may include one or more processors, such as the TX MIMO processor 220, the TX data processor 214, the receiver data processor 242 and/or the processor 230 of the eNB 210 illustrated in FIG. 2 or the TX data processor 238, the receiver data processor 260, and/or processor 270 of the UE 250 illustrated in FIG. 2.

According to certain aspects, such means may be implemented by processing systems configured to perform the corresponding functions by implementing various algorithms (e.g., in hardware or by executing software instructions) described above. For example, an algorithm for receiving a first request for one or more measurement reports associated with a first radio access technology (RAT), an algorithm for translating the first request to a group of second requests for measurement associated with a second RAT, and an algorithm for outputting at least some of the second requests to initiate gathering measurements associated with the second RAT for use in generating the one or more measurement reports associated with the second RAT.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

In some cases, rather than actually transmitting a frame a device may have an interface to output a frame for transmission. For example, a processor may output a frame, via a bus interface, to a radio frequency (RF) front end for transmission. Similarly, rather than actually receiving a frame, a device may have an interface to obtain a frame received from another device. For example, a processor may obtain (or receive) a frame, via a bus interface, from an RF front end for reception.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for receiving a first request for one or more measurement reports associated with a first radio access technology (RAT), instructions for translating the first request to a group of second requests for measurement associated with a second RAT, and instructions for outputting at least some of the second requests to initiate gathering measurements associated with the second RAT for use in generating the one or more measurement reports associated with the second RAT.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for measurement reporting, comprising:
receiving, via a first radio access technology (RAT), a first request for one or more measurement reports;
translating the first request to a group of second requests for measurement associated with at least a second RAT; and
transmitting at least one of the second requests to initiate gathering measurements associated with the second RAT for use in generating the one or more measurement reports in response to the first request.

2. The method of claim 1, wherein the first RAT comprises a wireless wide area network (WWAN) and the second RAT comprises a wireless local area network (WLAN).

3. The method of claim 1, wherein the first request comprises a request for one or more measurement reports triggered based on one or more criteria.

4. The method of claim 3, wherein the one or more criteria is based, at least in part, on at least one parameter indicative of channel quality in the second RAT.

5. The method of claim 3, wherein the one or more criteria is based, at least in part, at least one or more of a signal to noise ratio (SINR), a backhaul load, or a received signal strength indicator (RSSI).

6. The method of claim 3, wherein the one or more criteria is based, at least in part, on at least one received signal strength indicator (RSSI) threshold for a serving cell of the second RAT.

7. The method of claim 6, wherein at least one of the criteria comprises:
a measured RSSI for the second RAT exceeding or falling below the RSSI threshold by an amount of hysteresis.

8. The method of claim 6, further comprising transmitting one or more requests to terminate measurement reporting for the second RAT based on one or more exit criteria.

9. The method of claim 8, wherein the one or more exit criteria comprises:
a measured RSSI for the second RAT exceeding or falling below an RSSI threshold by an amount of hysteresis.

10. The method of claim 8, wherein the one or more requests to terminate measurement reporting for the second RAT are sent after receiving at least one of the one or more measurement reports.

11. The method of claim 1, further comprising:
receiving the one or more measurement reports associated with the second RAT, in response to the second requests; and
transmitting the one or more measurement reports associated with the second RAT via the first RAT.

12. The method of claim 1, wherein the translating is performed by a first modem processor associated with the first RAT, a second modem processor associated with the second RAT, or an applications processor in communications with the first and second modem processors.

13. The method of claim 1, wherein:
a neighboring cell is associated with the second RAT; and
the first request comprises a request for one or more measurement reports in the neighboring cell triggered when a measured received signal strength indicator (RSSI) in the neighboring cell exceeds an RSSI threshold by an amount of hysteresis.

14. The method of claim 1, wherein:
a neighboring cell is associated with the second RAT; and
the first request comprises a request for one or more measurement reports in the neighboring cell triggered when a first measured received signal strength indicator (RSSI) in a serving cell falls below a first RSSI threshold by an amount of hysteresis and when a second measured RSSI in the neighboring cell exceeds a second RSSI threshold by an amount of hysteresis.

15. An apparatus for measurement reporting, comprising:
a first interface for receiving, via a first radio access technology (RAT), a first request for one or more measurement reports;
a processing system configured to translate the first request to a group of second requests for measurement associated with at least a second RAT; and
a second interface for transmitting at least one of the second requests to initiate gathering measurements associated with the second RAT for use in generating the one or more measurement reports in response to the first request.

16. The apparatus of claim 15, wherein the first RAT comprises a wireless wide area network (WWAN) and the second RAT comprises a wireless local area network (WLAN).

17. The apparatus of claim 15, wherein the first request comprises a request for one or more measurement reports triggered based on one or more criteria.

18. The apparatus of claim 17, wherein the one or more criteria is based, at least in part, on at least one parameter indicative of channel quality in the second RAT.

19. The apparatus of claim 17, wherein the one or more criteria is based, at least in part, at least one or more of a signal to noise ratio (SINR), a backhaul load, or a received signal strength indicator (RSSI).

20. The apparatus of claim 17, wherein the one or more criteria is based, at least in part, on at least one received signal strength indicator (RSSI) threshold for a serving cell of the second RAT.

21. The apparatus of claim 20, wherein at least one of the criteria comprises:
a measured RSSI for the second RAT exceeding or falling below the RSSI threshold by an amount of hysteresis.

22. The apparatus of claim 20, wherein the second interface is further configured to transmit one or more requests to terminate measurement reporting for the second RAT based on one or more exit criteria.

23. The apparatus of claim 22, wherein the one or more exit criteria comprises:
a measured RSSI for the second RAT exceeding or falling below an RSSI threshold by an amount of hysteresis.

24. The apparatus of claim 22, wherein the one or more requests to terminate measurement reporting for the second RAT are sent after receiving at least one of the one or more measurement reports.

25. The apparatus of claim 15, further comprising a third interface for receiving the one or more measurement reports associated with the second RAT, in response to the second requests; and a fourth interface for transmitting the one or more measurement reports associated with the second RAT via the first RAT.

26. The apparatus of claim 15, wherein the translating is performed by a first modem processor associated with the first RAT, a second modem processor associated with the second RAT, or an applications processor in communications with the first and second modem processors.

27. The apparatus of claim 15, wherein:
a neighboring cell is associated with the second RAT; and
the first request comprises a request for one or more measurement reports in the neighboring cell triggered when a measured received signal strength indicator (RSSI) in the neighboring cell exceeds an RSSI threshold by an amount of hysteresis.

28. The apparatus of claim 15, wherein:
a neighboring cell is associated with the second RAT; and
the first request comprises a request for one or more measurement reports in the neighboring cell triggered when a first measured received signal strength indicator (RSSI) in a serving cell falls below a first RSSI threshold by an amount of hysteresis and when a second measured RSSI in the neighboring cell exceeds a second RSSI threshold by an amount of hysteresis.

29. An apparatus for measurement reporting, comprising:
means for receiving, via a first radio access technology (RAT), a first request for one or more measurement reports;
means for translating the first request to a group of second requests for measurement associated with at least a second RAT; and
means for transmitting at least one of the second requests to initiate gathering measurements associated with the second RAT for use in generating the one or more measurement reports in response to the first request.

30. A non-transitory computer-readable medium for measurement reporting by an apparatus having instruction stored thereon, the instructions executable by one or more processors for:
receiving, via a first radio access technology (RAT), a first request for one or more measurement reports;
translating the first request to a group of second requests for measurement associated with at least a second RAT; and
transmitting at least one of the second requests to initiate gathering measurements associated with the second RAT for use in generating the one or more measurement reports in response to the first request.

* * * * *